US012547090B2

(12) United States Patent
Ochi et al.

(10) Patent No.: US 12,547,090 B2
(45) Date of Patent: Feb. 10, 2026

(54) TONER

(71) Applicant: CANON KABUSHIKI KAISHA, Tokyo (JP)

(72) Inventors: Kouichirou Ochi, Chiba (JP); Masayuki Hama, Ibaraki (JP); Hayato Ida, Ibaraki (JP); Yuya Chimoto, Chiba (JP); Hisasuke Kajihara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 826 days.

(21) Appl. No.: 17/659,084

(22) Filed: Apr. 13, 2022

(65) Prior Publication Data
US 2022/0342335 A1 Oct. 27, 2022

(30) Foreign Application Priority Data

Apr. 23, 2021 (JP) ................................. 2021-073404
Jan. 19, 2022 (JP) ................................. 2022-006121

(51) Int. Cl.
*G03G 9/087* (2006.01)
*G03G 9/08* (2006.01)
*G03G 9/097* (2006.01)

(52) U.S. Cl.
CPC ....... *G03G 9/09716* (2013.01); *G03G 9/0819* (2013.01); *G03G 9/08711* (2013.01)

(58) Field of Classification Search
CPC ........... G03G 9/08711; G03G 9/08755; G03G 9/0926; G03G 9/09708; G03G 9/09716; G03G 9/09791
See application file for complete search history.

(56) References Cited

U.S. PATENT DOCUMENTS

| | | | |
|---|---|---|---|
| 6,430,384 B2 | 8/2002 | Hama et al. |
| 7,135,263 B2 | 11/2006 | Kawakami et al. |
| 7,833,687 B2 | 11/2010 | Kato et al. |
| 8,697,327 B2 | 4/2014 | Shibata et al. |
| 8,921,023 B2 | 12/2014 | Baba et al. |
| 8,927,188 B2 | 1/2015 | Naka et al. |
| 9,057,970 B2 | 6/2015 | Ida et al. |
| 9,348,247 B2 | 5/2016 | Ida et al. |
| 9,348,253 B2 | 5/2016 | Kanno et al. |
| 9,448,501 B2 | 9/2016 | Inoue et al. |
| 9,540,483 B2 | 1/2017 | Ida et al. |
| 9,651,883 B2 | 5/2017 | Hama et al. |
| 9,665,023 B2 | 5/2017 | Kamae et al. |
| 9,696,644 B2 | 7/2017 | Ida et al. |
| 9,897,934 B2 | 2/2018 | Tamura et al. |
| 10,012,920 B2 | 7/2018 | Shibata et al. |
| 10,036,970 B2 | 7/2018 | Kanno et al. |
| 10,078,281 B2 | 9/2018 | Ida et al. |
| 10,082,743 B2 | 9/2018 | Hama et al. |
| 10,088,765 B2 | 10/2018 | Miyakai et al. |
| 10,146,146 B2 | 12/2018 | Komatsu et al. |
| 10,175,595 B2 | 1/2019 | Onozaki et al. |
| 10,197,936 B2 | 2/2019 | Onozaki et al. |
| 10,203,619 B2 | 2/2019 | Yamashita et al. |
| 10,228,629 B2 | 3/2019 | Tamura et al. |
| 10,274,851 B2 | 4/2019 | Hashimoto et al. |
| 10,353,312 B2 | 7/2019 | Kamae et al. |
| 10,401,748 B2 | 9/2019 | Hashimoto et al. |
| 10,423,086 B2 | 9/2019 | Hama et al. |
| 10,451,986 B2 | 10/2019 | Sano et al. |
| 10,451,990 B2 | 10/2019 | Kamae et al. |
| 10,474,049 B2 | 11/2019 | Onozaki et al. |
| 10,514,624 B2 | 12/2019 | Tamura et al. |
| 10,564,560 B2 | 2/2020 | Onozaki et al. |
| 10,599,060 B2 | 3/2020 | Kanno et al. |
| 10,656,545 B2 | 5/2020 | Kamae et al. |
| 10,775,710 B1 | 9/2020 | Kamae et al. |
| 10,859,931 B2 | 12/2020 | Hashimoto et al. |
| 10,877,386 B2 | 12/2020 | Murayama et al. |
| 10,969,705 B2 | 4/2021 | Shirayama et al. |
| 11,029,617 B2 | 6/2021 | Chimoto et al. |
| 11,112,711 B2 | 9/2021 | Ochi et al. |
| 11,131,939 B2 | 9/2021 | Hama et al. |
| 11,181,848 B2 | 11/2021 | Ochi et al. |
| 2013/0108955 A1 | 5/2013 | Shibata et al. |

(Continued)

FOREIGN PATENT DOCUMENTS

| | | |
|---|---|---|
| JP | 8-339095 A | 12/1996 |
| JP | 2005-99422 A | 4/2005 |

(Continued)

OTHER PUBLICATIONS

U.S. Appl. No. 17/648,330, Hiroki Watanabe, filed Jan. 19, 2022,
U.S. Appl. No. 17/648,333, Ichiro Kanno, filed Jan. 19, 2022.
U.S. Appl. No. 17/648,368, Ichiro Kanno, filed Jan. 19, 2022.
U.S. Appl. No. 17/654,461, Yukihiro Abe, filed Mar. 11, 2022.
U.S. Appl. No. 17/654,481, Kazuki Murata, filed Mar. 11, 2022.
U.S. Appl. No. 17/656,282, Takeshi Hashimoto, filed Mar. 24, 2022.

(Continued)

*Primary Examiner* — Peter L Vajda
(74) *Attorney, Agent, or Firm* — VENABLE LLP

(57) ABSTRACT

A toner comprising a toner particle comprising a colorant, a binder resin, and calcium carbonate particles, wherein an amount of the colorant in the toner particle is from 1.0 to 20.0% by mass; the binder resin comprises a polyester resin; the polyester resin has an aromatic ring concentration of from 50 to 70 mol %; a surface of the calcium carbonate particles is coated with a fatty acid; an amount of the calcium carbonate particles in the toner particle is from 1.0 to 15.0% by mass; a number average particle diameter of the calcium carbonate particles is from 150 nm to 800 nm.

12 Claims, No Drawings

(56) References Cited

U.S. PATENT DOCUMENTS

| | | | |
|---|---|---|---|
| 2014/0128529 A1* | 5/2014 | Sakai | B82Y 30/00 524/394 |
| 2014/0134535 A1 | 5/2014 | Baba et al. | |
| 2015/0099227 A1 | 4/2015 | Ida et al. | |
| 2017/0082933 A1 | 3/2017 | Dan | |
| 2018/0314176 A1 | 11/2018 | Ikeda et al. | |
| 2020/0310273 A1 | 10/2020 | Chimoto et al. | |
| 2020/0409284 A1 | 12/2020 | Matsubara et al. | |
| 2020/0409285 A1 | 12/2020 | Tokunaga et al. | |
| 2021/0080848 A1 | 3/2021 | Tsuchida et al. | |
| 2021/0141315 A1 | 5/2021 | Kamae et al. | |
| 2021/0181647 A1 | 6/2021 | Hashimoto et al. | |
| 2021/0181649 A1 | 6/2021 | Kanno et al. | |
| 2021/0181650 A1 | 6/2021 | Hama et al. | |
| 2021/0181651 A1 | 6/2021 | Kanno et al. | |
| 2021/0278774 A1 | 9/2021 | Hashimoto et al. | |
| 2021/0278775 A1 | 9/2021 | Kamae et al. | |
| 2022/0187728 A1 | 6/2022 | Miura et al. | |
| 2022/0197163 A1 | 6/2022 | Kajihara et al. | |
| 2022/0197166 A1 | 6/2022 | Chimoto et al. | |
| 2022/0197174 A1 | 6/2022 | Kajihara et al. | |

FOREIGN PATENT DOCUMENTS

| | | | | |
|---|---|---|---|---|
| JP | 2013-200559 A | 10/2013 | | |
| JP | 2015-194667 A | 11/2015 | | |
| JP | 2016-99517 A | 5/2016 | | |
| JP | 2016-114828 A | 6/2016 | | |
| JP | 2017-3901 A | 1/2017 | | |
| JP | 2019-211505 A | 12/2019 | | |
| JP | 2021-182045 A | 11/2021 | | |
| WO | WO-2015141321 A1 * | 9/2015 | ......... | G03G 15/0865 |

OTHER PUBLICATIONS

U.S. Appl. No. 17/663,935, Miki Ueda, filed May 18, 2022.
U.S. Appl. No. 17/664,102, Megumi Shino, filed May 19, 2022.

* cited by examiner

TONER

BACKGROUND OF THE INVENTION

Field of the Invention

The present disclosure relates to a toner suitable for using an electrophotographic image forming method.

Description of the Related Art

In recent years, electrophotographic full-color copiers are widely used, and such copiers require high speed, high image quality, high productivity, and cost reduction. It is known to finely disperse a pigment in a toner, thereby increasing the image density of a printed matter, in order to achieve such improvement of image quality (Japanese Patent Application Publication No. 2005-099422). Further, a technique of decreasing the amount of toner raw material used by using an inexpensive filler is known to reduce cost (Japanese Patent Application Publication No. 2016-114828 and Japanese Patent Application Publication No. H08-339095).

However, it was found that there is still room for improvement in chromogenicity of images after fixing, in particular, when the toners described in the above documents are used to output a high-gloss printed matter.

SUMMARY OF THE INVENTION

The present disclosure provides a toner in which a finely dispersed state of a colorant is maintained and which realizes high chromogenicity even when a high-gloss printed matter is output.

The present disclosure relates to a toner comprising a toner particle,
the toner particle comprising a colorant, a binder resin, and calcium carbonate particles, wherein
an amount of the colorant in the toner particle is from 1.0 to 20.0% by mass,
the binder resin comprises a polyester resin,
the polyester resin has an aromatic ring concentration of from 50 to 70 mol % calculated by a following formula:

aromatic ring concentration (mol %)=(number of moles of carbon constituting aromatic rings)/ (total number of moles of carbon)×100, a surface of the calcium carbonate particles is coated with a fatty acid,
an amount of the calcium carbonate particles in the toner particle is from 1.0 to 15.0% by mass, and
a number average particle diameter of the calcium carbonate particles is from 150 to 800 nm.

According to the present disclosure, it is possible to provide a toner in which a finely dispersed state of a colorant is maintained and which realizes high chromogenicity even when a high-gloss printed matter is output.

Further features of the present invention will become apparent from the following description of exemplary embodiments.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

The present disclosure relates to a toner comprising a toner particle,
the toner particle comprising a colorant, a binder resin, and calcium carbonate particles, wherein
an amount of the colorant in the toner particle is from 1.0 to 20.0% by mass,
the binder resin comprises a polyester resin,
the polyester resin has an aromatic ring concentration of from 50 to 70 mol % calculated by a following formula:

aromatic ring concentration (mol %)=(number of moles of carbon constituting aromatic rings)/ (total number of moles of carbon)×100, a surface of the calcium carbonate particles is coated with a fatty acid,
an amount of the calcium carbonate particles in the toner particle is from 1.0 to 15.0% by mass, and
a number average particle diameter of the calcium carbonate particles is from 150 to 800 nm.

The following can be considered as the reason why the chromogenicity of the image is enhanced by the toner. It is known that where a colorant is finely dispersed inside an image film after the toner is fixed, a high-chroma image can be obtained. Meanwhile, when trying to obtain a high-gloss printed matter, it is necessary to fix the toner at a high temperature, so that the viscosity of toner particles becomes low in the fixing process. As a result, the colorant in the toner particle is aggregated, and as a result, the colorant remains aggregated in the image, so that the chromogenicity is deteriorated.

However, it has been found that with the above toner, the colorant can be prevented from aggregating even after fixing performed after melting at a high temperature, and an image with high chroma can be obtained. It is considered that the reason therefor is that the calcium carbonate particles surface-treated by the fatty acid that are contained in the toner particle flow in the toner during the toner fixing process and prevent the colorant from aggregating. In particular, it is considered that when a polyester resin having an aromatic ring concentration of 50 mol % to 70 mol % is used as a binder resin, this action is specifically expressed in a resin having a bulky structure, and the above-mentioned effect is exhibited.

Hereinafter, each component of the toner will be described.

Calcium Carbonate Particles

The toner particle includes from 1.0% by mass to 15.0% by mass of calcium carbonate particles. Where the amount of calcium carbonate particles is lower than 1.0% by mass, the chromogenicity is not improved because there are few calcium carbonate particles that contribute to the suppression of aggregation of the colorant (preferably, a pigment) during the fixing process. Where the amount is more than 15.0% by mass, there are too many calcium carbonate particles, and since the calcium carbonate particles scatter light, the chromogenicity is not improved. The amount of the calcium carbonate particles in the toner particle is preferably from 1.5% by mass to 12.0% by mass, and more preferably from 2.0% by mass to 10.0% by mass.

The calcium carbonate particles comprised in the toner particle are coated with a fatty acid. Known fatty acids can be used, but linear saturated fatty acids having from 8 to 28 carbon atoms (preferably from 12 to 24 carbon atoms, and more preferably from 16 to 22 carbon atoms) such as nonanoic acid, lauric acid, stearic acid, cerotic acid, and the like are preferable. From the viewpoint of facilitating the flow of calcium carbonate particles during the fixing process, stearic acid is particularly preferred. When the number of carbon atoms is 8 or more, or when no other polar functional group is contained, the flow of calcium carbonate particles during the fixing process becomes more sufficient due to the interaction with the binder resin, and the effect of suppressing the aggregation of the colorant is further improved.

Further, the coating amount of the fatty acid in the calcium carbonate particle is preferably from 0.1% by mass to 5.0% by mass, more preferably from 0.5% by mass to 4.0% by mass, and even more preferably from 1.0% by mass to 3.0% by mass. Within this range, the flowability of calcium carbonate is effectively promoted during the fixing process, and the chromogenicity is improved. A means for coating the calcium carbonate particles with a fatty acid is not particularly limited. For example, a method of mixing a fatty acids and calcium carbonate particles by using a known mixer such as a Henschel mixer and heating can be mentioned.

The number average particle diameter of calcium carbonate particles is from 150 nm to 800 nm. Where the number average particle diameter is smaller than 150 nm, the effect of suppressing the aggregation of the colorant is not exhibited due to the small particle diameter of calcium carbonate that contributes to the suppression of the aggregation of the colorant. Where the number average particle diameter is larger than 800 nm, the number of particles of calcium carbonate that contributes to the suppression of aggregation of the colorant is reduced, so that the chromogenicity is not improved. The number average particle diameter is preferably from 200 nm to 700 nm, and more preferably from 300 nm to 600 nm.

The amount of the colorant in the toner particle is from 1.0% by mass to 20.0% by mass. Within the above range, the pigment is dispersed with appropriate dispersibility, and the chromogenicity becomes good. The amount of the colorant in the toner particle is preferably from 1.0% by mass to 10.0% by mass, more preferably from 2.0% by mass to 8.0% by mass, and particularly preferably from 3.0% by mass to 7.0% by mass.

Further, where the amount of colorant in a toner particle is denoted by A (% by mass) and the amount of calcium carbonate particles in the toner particle is denoted by B (% by mass), a value of A/B is preferably 0.5 to 3.0, and more preferably 0.8 to 2.5. Within these ranges, calcium carbonate suppresses the aggregation of the colorant to a greater extent during the fixing process, and the chromogenicity of the image is further improved.

Binder Resin

The binder resin comprises a polyester resin. The aromatic ring concentration of the polyester resin is from 50 mol % to 70 mol %. Here, the aromatic ring concentration of the polyester resin is the molar concentration of carbon constituting the aromatic ring in the total carbon contained in the polyester resin. Where the aromatic ring concentration is from 50 mol % to 70 mol %, the calcium carbonate particles coated with the fatty acid easily flow during the fixing process, and the aggregation of the colorant is prevented. It is considered that this is because the entanglement of the fatty acid and the resin on the surface of the calcium carbonate particles is suppressed by the appropriate bulkiness of the binder resin based on the high aromatic ring concentration. Two or more types of such polyester resins may be used in combination, and the aromatic ring concentration in the case of such combination is an average value based on the mass fraction of the two or more types of polyester resins.

A polyester resin is a condensate of a polyhydric alcohol compound and a polyvalent carboxylic acid compound. The aromatic ring concentration of the polyester resin can be adjusted to from 50 mol % to 70 mol % by selecting, as appropriate, a compound as shown below. The aromatic ring concentration of the polyester resin is preferably from 55 mol % to 60 mol %. Within this range, the flowability of calcium carbonate can be further ensured in the fixing process, and the chromogenicity of the image is further improved.

The alcohol component can be exemplified by the following:

alkylene oxide adducts of bisphenol A, such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane, and also ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, and derivatives of the preceding. These derivatives should provide the same resin structure by the aforementioned condensation polymerization, but are not otherwise particularly limited. Examples here are derivatives provided by the esterification of the alcohol component.

As the polyhydric alcohol compound, from the viewpoint of fixing performance, it is preferable to use at least one selected from the group consisting of alkylene oxide adducts of bisphenol A. The proportion of the alkylene oxide adduct of bisphenol A in the polyhydric alcohol compound is preferably 50 mol % to 100 mol %, and more preferably 70 mol % to 100 mol %.

The carboxylic acid component can be exemplified by the following:

aromatic dicarboxylic acids such as phthalic acid, isophthalic acid, and terephthalic acid, and their anhydrides; alkyldicarboxylic acids such as succinic acid, adipic acid, sebacic acid, and azelaic acid, and their anhydrides; succinic acid substituted by an alkyl group or alkenyl group having 6 to 18 carbons, and their anhydrides; unsaturated dicarboxylic acids such as fumaric acid, maleic acid, and citraconic acid, and their anhydrides, and derivatives of the preceding. The derivatives should be dicarboxylic acid derivatives that provide the same resin structure by the aforementioned condensation polymerization, but are not otherwise particularly limited. Examples here are derivatives provided by the methyl esterification or ethyl esterification of the carboxylic acid component and derivatives provided by conversion of the carboxylic acid component into the acid chloride.

The proportion of the aromatic dicarboxylic acid or anhydride thereof in the polyvalent carboxylic acid compound is preferably 50 mol % to 100 mol %, and more preferably 70 mol % to 100 mol %. The content ratio of the polyester resin in the toner particle is preferably 45% by mass to 80% by mass, more preferably 50.0% by mass to 75% by mass, and further preferably 55% by mass to 70% by mass.

Further, the binder resin preferably comprises a resin having a polystyrene skeleton. By comprising a resin having a polystyrene skeleton, the flowability of calcium carbonate can be further ensured in the fixing process, and the chromogenicity of the image is further improved.

From the viewpoint of suppressing the aggregation of the colorant, the amount of the resin having a polystyrene skeleton in the toner particle is preferably from 0.3% by mass to 25% by mass, and more preferably from 1% by mass to 20% by mass. The amount of the styrene-polymerized monomer unit in the resin having a polystyrene skeleton is preferably from 30% by mass to 80% by mass, and more preferably from 35% by mass to 50% by mass. The monomer unit refers to the reacted form of the monomer substance in the polymer.

Examples of the resin having a polystyrene skeleton include homopolymers of styrene such as polystyrene, poly-p-chlorostyrene, polyvinyltoluene, and the like and substitution products thereof; and polystyrene and copolymers thereof such as styrene-p-chlorstyrene copolymer, styrene—vinyl toluene copolymer, styrene—vinyl naphthalene copolymer, styrene—acrylic acid ester copolymer, styrene—methacrylic acid ester copolymer, styrene—α-chloromethyl methacrylate copolymer, styrene—acrylonitrile copolymer, styrene—vinyl methyl ether, styrene—vinyl ethyl ether copolymer, styrene—vinyl methyl ketone copolymer, styrene—acrylonitrile—indene copolymer, and the like. Of these, styrene—acrylic acid ester copolymer is preferable, and styrene—n-butyl acrylate copolymer is more preferable from the viewpoint of fixing performance.

Colorant

The toner particle includes a colorant. The colorant preferably includes a pigment. The colorant preferably includes a pigment having an SP value of from 8.0 $(cal/cm^3)^{(1/2)}$ to 10.0 $(cal/cm^3)^{(1/2)}$. The SP value is more preferably from 8.5 $(cal/cm^3)^{(1/2)}$ to 9.5 $(cal/cm^3)^{(1/2)}$. By using such a pigment, the affinity with the calcium carbonate particles surface-treated with fatty acid is enhanced, and the aggregation of the pigment is easily suppressed. Such pigments may be used alone or in combination with dyes as needed. The colorant preferably includes at least one selected from the group consisting of magenta pigments, cyan pigments and yellow pigments. Specifically, examples of the colorant include the following.

Pigments for magenta can be exemplified by the following: C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C. I. Pigment Violet 19; and C. I. Vat Red 1, 2, 10, 13, 15, 23, 29, and 35. Of these, Pigment Red 122 (PR122) is preferable from the viewpoint of further suppressing the aggregation of the pigment.

Dyes for magenta toners can be exemplified by the following: oil-soluble dyes such as C. I. Solvent Red 1, 3, 8, 23, 24, 25, 27, 30, 49, 81, 82, 83, 84, 100, 109, and 121; C. I. Disperse Red 9; C. I. Solvent Violet 8, 13, 14, 21, and 27; and C. I. Disperse Violet 1, and basic dyes such as C. I. Basic Red 1, 2, 9, 12, 13, 14, 15, 17, 18, 22, 23, 24, 27, 29, 32, 34, 35, 36, 37, 38, 39, and 40 and C. I. Basic Violet 1, 3, 7, 10, 14, 15, 21, 25, 26, 27, and 28.

Pigments for cyan can be exemplified by the following: C. I. Pigment Blue 2, 3, 15:2, 15:3, 15:4, 16, and 17; C. I. Vat Blue 6; C. I. Acid Blue 45; and copper phthalocyanine pigments having at least 1 and not more than 5 phthalimidomethyl groups substituted on the phthalocyanine skeleton. Of these, Pigment Blue 15:3 (PB15:3) is preferable from the viewpoint of further suppressing the aggregation of the pigment. C. I. Solvent Blue 70 is an example of a dye for cyan toners.

Pigments for yellow can be exemplified by the following: C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185 and by C. I. Vat Yellow 1, 3, and 20. Of these, Pigment Yellow 74 (PY74) and Pigment Yellow 180 (PY180) are preferable from the viewpoint of further suppressing the aggregation of the pigment.

C. I. Solvent Yellow 162 is an example of a dye for yellow toners. A single one of these colorants may be used or a mixture may be used and these colorants may also be used in a solid solution state.

Release Agent

If necessary, a release agent that suppresses the occurrence of hot offset during heating and fixing of the toner may be used. As the release agent, low molecular weight polyolefins, silicone waxes, fatty acid amides, ester waxes, carnauba wax, hydrocarbon waxes and the like can be generally exemplified.

External Additives

An external additive may be added to the toner particle. As the external additive, inorganic fine particles such as silica, titanium oxide, and aluminum oxide are preferable. The inorganic fine particles are preferably hydrophobized with a hydrophobizing agent such as a silane compound, silicone oil or a mixture thereof As the external additive for improving the flowability, inorganic fine particles having a specific surface area of from 50 $m^2/g$ to 400 $m^2/g$ are preferable, and for stabilizing durability, inorganic fine particles having a specific surface area of from 10 $m^2/g$ to 50 $m^2/g$ are preferably. Inorganic fine particles having a specific surface area in the above range may be used in combination in order to achieve both improvement in flowability and stabilization of durability.

The amount of the external additive is preferably from 0.1 part by mass to 10.0 parts by mass with respect to 100 parts by mass of the toner particles. A known mixer such as a Henschel mixer can be used for mixing the toner particles and the external additive.

Next, a method for producing the toner will be described.

Method for Producing Toner

Examples of the method for producing the toner include a kneading and pulverizing method, a dissolution suspension method, a suspension polymerization method, and an emulsification and aggregation method. The toner may be produced by any single production method, or the methods may be combined. Hereinafter, the method for producing toner by the kneading and pulverizing method will be specifically exemplified, but the method is not limiting.

Kneading and Pulverizing Method

In the kneading and pulverizing method, first, a binder resin, calcium carbonate particles and a colorant, which are the constituent materials of the toner, and also a release agent and other additives added as necessary are sufficiently mixed, and then melt-kneaded using a known hot kneader such as a heating roll or a kneader (kneading step). Then, the toner is mechanically pulverized to a desired toner particle diameter (pulverizing step), and classification to obtain a desired particle diameter distribution (classification step) is performed to produce toner. At the time of mixing, a masterbatch in which a part of the binder resin, calcium carbonate particles and the colorant are melt-kneaded in advance may be used.

Kneading Step

The melt kneading of the constituent materials of the toner can be performed using a known hot kneader such as a heating roll or a kneader. In the kneading step, it is preferable that the constituent materials of the toner be sufficiently mixed in advance using a mixer.

Examples of apparatuses used for the mixing include a Henschel mixer (available from Nippon Coke & Engineering Co., Ltd.); a super mixer (available from Kawata Mfg. Co., Ltd.); a Ribocone (available from Okawara Mfg. Co., Ltd.); a Nauta Mixer, Turbulizer or Cyclomix (available from Hosokawa Micron Corporation); a spiral pin mixer (available from Pacific Machinery & Engineering Co., Ltd.); and a Loedige Mixer (available from Matsubo Corporation).

As a hot kneader, a KRC kneader (manufactured by Kurimoto, Ltd.); Buss Co-kneader (manufactured by Buss AG); a TEM type extruder (manufactured by Toshiba Machinery Co., Ltd.); a TEX twin-screw kneader (manufactured by Japan Steel Works. Ltd.), a PCM kneader (manufactured by Ikegai Corp.); a three-roll mill, a mixing roll mill, and a kneader (manufactured by Inoue Mfg. Co., Ltd.); Kneedex (manufactured by Nippon Coke & Eng. Co., Ltd.); an MS type pressurized kneader, Kneader-Ruder (manufactured by K. K. Moriyama Seisakusho); a Banbury mixer (manufactured by Kobe Steel Works, Ltd.) can be mentioned.

Pulverizing Step

The pulverizing step is a step in which the kneaded product obtained in the kneading step is cooled until a hardness suitable for pulverizing is reached, and then mechanical pulverizing is performed to the toner particle diameter with a known pulverizer such as a collision plate type jet mill, a fluidized bed type jet mill, a rotary mechanical mill, and the like. From the viewpoint of pulverization efficiency, it is desirable to use a fluidized bed type jet mill as the pulverizer.

Examples of the pulverizers include a counter jet mill, Micron Jet, Inomizer (manufactured by Hosokawa Micron Corp.); an IDS type mill, a PJM jet pulverizer (manufactured by Nippon Pneumatic Mfg. Co., Ltd.); a cross jet mill (manufactured by Kurimoto, Ltd.); Ulmax (manufactured by Nisso Engineering Co., Ltd.); SK Jet-O-Mill (Seishin Enterprise Co., Ltd.); Cryptron (Kawasaki Heavy Industries Co., Ltd.); Turbo Mill (Turbo Industry Co., Ltd.); Super Rotor (Nisshin Engineering Co., Ltd.); and the like.

Classification Step

The classification step is a step of classifying the finely pulverized product obtained in the above pulverizing step to obtain a toner having a desired particle size distribution. As the classifier to be used for the classification, a known device such as a wind power classifier, an inertial classifier, and a sieve classifier can be used. Specific examples include Classiel, Micron Classifier, Spedic Classifier (manufactured by Seishin Enterprise Co., Ltd.); Turbo Classifier (manufactured by NisshinEngineering Co., Ltd.); Micron Separator, Turboplex (ATP), TSP Separator (manufactured by Hosokawa Micron Corp.) Elbow Jet (manufactured by Nittetsu Mining Co., Ltd.), dispersion separator (manufactured by Nippon Pneumatic Mfg. Co., Ltd.); and YM Microcut (manufactured by Yasukawa Shoji Co., Ltd.).

The weight average particle diameter of the toner particles is preferably 4 μm to 12 μm and more preferably 5 μm to 8 μm. The toner particles produced through the above steps may be used as they are as toner. The following may be added on an optional basis to the toner particles in the dry state with the application of shear force: inorganic fine particles, such as silica, alumina, titania, calcium carbonate, and so forth; and/or resin fine particles, such as vinyl resin, polyester resin, silicone resin, and so forth. These inorganic fine particles and resin fine particles function as external additives, e.g., flowability auxiliaries, cleaning auxiliaries, and so forth.

The toner can be used as a one-component developer, but it may be mixed with a magnetic carrier and used as a two-component developer. Examples of the magnetic carrier include generally known magnetic carriers such as magnetic bodies such as surface-oxidized iron powder, unoxidized iron powder, metal particles such as iron, lithium, calcium, magnesium, nickel, copper, zinc, cobalt, manganese, and rare earth, particles of alloys thereof, oxide particles, ferrites, etc., and magnetic body-dispersed resin carriers (the so-called resin carriers) including magnetic bodies and a binder resin in which the magnetic bodies are held in a dispersed state.

When the toner is mixed with a magnetic carrier and used as a two-component developer, good results are usually obtained when the carrier mixing ratio at that time is preferably from 2% by mass to 15% by mass, and more preferably from 4% by mass to 13% by mass as the toner concentration in the two-component developer.

The following describes how to measure each physical property.

Method for Separating Toner Particles from Toner

Where the toner comprises an external additive, the toner particles can be separated by removing the external additive from the toner. First, 160 g of sucrose (manufactured by Kishida Chemical Co., Ltd.) is added to 100 mL of ion-exchanged water and dissolved in a hot-water bath to prepare a sucrose concentrate. Subsequently, 31 g of the prepared sucrose concentrate and 6 mL of Contaminone N (manufactured by Wako Pure Chemical Industries, Ltd.) are added to a centrifuge tube to prepare a dispersion liquid. Contaminone N is a 10% by mass aqueous solution of a neutral detergent for cleaning precision measuring instruments that has a pH of 7 and consists of a nonionic surfactant, an anionic surfactant, and an organic builder.

A total of 1.0 g of toner is added to this dispersion and the toner lumps are loosened with a spatula etc. Next, the centrifuge tube including the dispersion liquid to which the toner is added is shaken with a shaker. After shaking, the solution in the centrifuge tube is transferred into a glass tube (50 mL) for a swing rotor and centrifuged at 3500 rpm for 30 min in a centrifuge. By this operation, the toner particles and the external additive are separated. Sufficient separation of the toner particles and the aqueous solution is visually confirmed, and the toner particles are collected, filtered with a vacuum filter, and then dried in a dryer for 1 h or more to remove the external additive from the toner and obtain the separated toner particles.

Method for Separating each Material from Toner Particles

For the toner particles obtained by the above method, each material can be separated from the toner particles by utilizing the solubility of each contained material in a solvent and a difference in specific gravity. Specifically, for example, the following methods can be used.

First separation: toner particles are dissolved in tetrahydrofuran at 23° C. and separated into soluble components (binder resin) and insoluble components (calcium carbonate particles, release agent, and colorant).

Second separation: the insoluble component obtained by the first separation is dissolved in hexane at 50° C., and the soluble component (release agent) and the insoluble component (calcium carbonate particles and colorant) are separated.

Third separation: the insoluble component obtained by the second separation is dispersed in tetrahydrofuran, and the centrifugal force in the centrifugal separation method is changed to separate the calcium carbonate particles and the colorant based on the difference in specific gravity.

Further, the obtained binder resin can be separated into a polyester resin and a resin having a polystyrene skeleton by, for example, the following method by using the difference in solubility in a solvent. First, the binder resin obtained by the first separation is dissolved in acetone, and hexane having a mass three times that of acetone is added dropwise to precipitate the insoluble component while stirring the dissolved substance. After the precipitate is filtered and separated, the solvent is removed and drying is performed to obtain the polyester resin. Meanwhile, the filtrate is distilled under reduced pressure to separate the resin having a styrene skeleton.

Amount of Colorant and Amount of Calcium Carbonate Particles

The amount of the colorant is calculated from the amount of the colorant separated from the toner particles by the above method. In addition, the amount of calcium carbonate particles is calculated from the amount of calcium carbonate particles separated from the toner particles by the above method. Further, a value of AB is calculated from the amounts of colorant and calcium carbonate particles.

Amount of Surface Treatment Material for Calcium Carbonate Particles

The calcium carbonate particles separated from toner particles by the above method are measured using a thermogravimetric/differential thermal analyzer (differential thermal balance TG-DTA, ThermoPlus TG8120 manufactured by Rigaku Corp.), the temperature is raised from 25° C. to 400° C. at a rate of 10° C./min, and the coating amount of the surface treatment agent is measured from the weight change.

Structure of Surface Treatment Material for Calcium Carbonate Particles

The structure is analyzed in the following manner by a pyrolysis gas chromatography mass spectrometer (GC/MS). A total of 300 μg of calcium carbonate separated from the toner particles by the above method is embedded in the following Pyrofoil F590 that is thereafter introduced into a pyrolysis oven and heated at 590° C. for 5 sec in an inert (helium) atmosphere. The generated decomposition gas is introduced in an injection port of the gas chromatographer, and the following oven profile is implemented. The column outlet is connected to a MS analyzer by a transfer line, and a total ion chromatogram (TIC) is obtained by plotting the ion current against the ordinate and the retention time on the abscissa. Then, the mass spectrum is extracted with the provided software for all the detected peaks in the obtained chromatogram, and the compound is attributed based on the NIST-2017 database.

The Measuring Device and Measuring Conditions are as Follows.

Pyrolysis oven: Japan Analytical Industry JSP900 (manufactured by Japan Analytical Industry Co., Ltd.)
Pyrofoil: F590 (manufactured by Japan Analytical Industry Co., Ltd.)
GC: Agilent Technologies 7890A GC
MS: Agilent Technologies 5975C
Column: HP-5 ms 30 m, inner diameter 0.25 mm, mobile phase thickness 0.25 μm (manufactured by Agilent Technologies, Inc.)
Carrier gas: He (purity 99.9995% or more)
Oven profile: (1) the temperature of 40° C. is held for 3 min, (2) the temperature is raised to 320° C. at 10° C./min, (3) the temperature is held at 320° C. for 20 min.
Injection port temperature: 280° C.
Split ratio: 50:1
Column flow rate: 1 mL/min (quantitative)
Transfer line temperature: 280° C.
Observation MS range: 30-600 Da
Ionization: EI 70 eV
Ion source temperature: 280° C.
Quadrupole temperature: 150° C.

Aromatic Ring Concentration of Polyester Resin

By measuring the polyester resin, which has been separated by the abovementioned method, with a gas chromatography mass spectrometer (GC/MS) in the same manner as in the structure identification of the surface treatment material for calcium carbonate particles, the monomer structure contained in the polyester resin is identified. Further, using ECA-400 (400 MHz) manufactured by JEOL Ltd., the amount (molar ratio) of each monomer is quantified from spectrum attribution by using $^1$H-NMR. From the information thus obtained, the aromatic ring concentration of the polyester resin is calculated using the following formula.

$$\text{Aromatic ring concentration (mol \%)}=[\text{number of moles of carbon constituting the aromatic rings}]/[\text{total number of moles of carbon}]\times 100$$

For example, the aromatic ring concentration of the polyester resin 1 described hereinbelow is 58 mol % based on this measurement.

Number Average Particle Diameter of Calcium Carbonate Particles

The calcium carbonate particles separated from the toner particles as described above are observed with a scanning electron microscope (S-4800, Hitachi High-Technologies Co., Ltd.), the major axis of 100 particles is measured, and the number average particle diameter is calculated by obtaining the arithmetic mean value thereof. If necessary, the calcium carbonate particles are specified using an energy dispersive X-ray spectrophotometer (EDX).

Calculation of SP Value

The SP value is an abbreviation for solubility parameter, and is a value that is an index of solubility. The SP value of a pigment is calculated in the following manner. In a 50 ml sample tube bottle, 1 g of pigment is dispersed in 10.00 g of accurately weighed chloroform. A total of 0.5 ml of methanol is added dropwise under stirring, the system is allowed to stand for 1 min, and then stirred to determine visually whether the pigment has precipitated. If the pigment has not precipitated, the above procedure is repeated until the pigment precipitates. Similarly, the same procedure is performed by using heptane instate of methanol. From the weights of chloroform and methanol or heptane at the time of precipitation, the SP value of the pigment is calculated from the following formulas.

$$\text{Pigment SP value}=(SP\alpha+SP\beta)/2$$

$$SP\alpha=(Vm^{1/2}\times SPm+Vc^{1/2}\times SPc)/(Vm^{1/2}+Vc^{1/2})$$

$$SP\beta=(Vc^{1/2}\times SPc+Vh^{1/2}\times SPh)/(Vc^{1/2}+Vh^{1/2})$$

Vm (cm$^3$): volume of methanol when the pigment has precipitated (specific gravity of methanol: 0.792)

Vc (cm$^3$): volume of chloroform when the pigment has precipitated (chloroform specific gravity: 1.490)

Vh (cm$^3$): volume of heptane when the pigment has precipitated (specific gravity of heptane: 0.684 SPm: SP value of methanol (14.5 (cal/cm$^3$)$^{(1/2)}$))

SPc: SP value of chloroform (9.3 (cal/cm$^3$)$^{(1/2)}$)

SPh: SP value of heptane (7.4 (cal/cm$^3$)$^{(1/2)}$)

SPm, SPc, SPh are quoted from the following documents.

References: Solubility Parameters: ALLAN F. M. BARTON Chemistry Department, Victoria University of Wellington, private Bag, Wellington, New Zealand Received Jun. 7, 1974 (Revised Manuscript Received Oct. 29, 1974).

EXAMPLES

Method for Measuring Weight-Average Particle Diameter (D4) of Toner

The weight-average particle diameter (D4) of the toner is measured using a precision particle size distribution measuring apparatus based on a pore electric resistance method with a 100 μm aperture tube (a Coulter Counter Multisizer 3 (registered trademark) produced by Beckman Coulter, Inc.) and dedicated software for the measurement apparatus (Beckman Coulter Multisizer 3 Version 3.51 produced by Beckman Coulter, Inc.) for settings for measurement conditions and analysis of measured data.

Hereinafter, the present invention will be described in more detail with reference to Examples and Comparative Examples, but the present invention is not limited thereto.

Production of Resin

Production of Polyester Resin 1

Polyvalent Carboxylic Acid Component

Terephthalic acid: 100 mol parts

Polyhydric Alcohol Component

Bisphenol A ethylene oxide 2 mol adduct: 100 mol parts

The abovementioned monomer components were put into a sufficiently heated and dried two-necked flask, 0.05 part of tetraisopropyl orthotitanate was added to 100 parts of the mixture, the temperature was raised while introducing nitrogen gas into the container to maintain an inert atmosphere, then a polycondensation reaction was carried out at 230° C., and the pressure was further reduced to raise the temperature to 250° C. and polymerize the resin. As a crystallization treatment of the obtained resin, 40 parts of the obtained resin was added to a beaker containing 160 parts of toluene, heated to 90° C. to dissolve the resin, and then slowly cooled to 25° C. over 6 h to precipitate the resin. The precipitated resin was filtered and dried to obtain a polyester resin 1. The obtained characteristics are shown in Table 1.

Production of Polyester Resins 2 to 5

Polyester resins 2 to 5 were obtained in the same manner as in the production of the polyester resin 1, except that the materials were changed to those shown in Table 1.

TABLE 1

| Resin | Polyvalent carboxylic acid component | | | | Polyhydric alcohol component | | | | Aromatic ring concentration (%) |
|---|---|---|---|---|---|---|---|---|---|
| | Type | Molar parts | Type | Molar parts | Type | Molar parts | Type | Molar parts | |
| Polyester resin 1 | Terephthalic acid | 100 | — | | Bisphenol A propylene oxide 2 mol adduct | 100 | — | | 58% |
| Polyester resin 2 | Terephthalic acid | 70 | Succinic acid | 30 | Bisphenol A ethylene oxide 2 mol adduct | 80 | Ethylene glycol | 20 | 53% |
| Polyester resin 3 | Terephthalic acid | 100 | — | | Bisphenol A ethylene oxide 1 mol adduct | 100 | — | | 67% |
| Polyester resin 4 | Terephthalic acid | 80 | Succinic acid | 20 | Bisphenol A propylene oxide 2 mol adduct | 80 | Ethylene glycol | 20 | 49% |
| Polyester resin 5 | Terephthalic acid | 100 | — | | Bisphenol A ethylene oxide 2 mol adduct | 60 | Bisphenol A | 40 | 71% |

The aromatic ring concentration is in mol %.

Production of Styrene Acrylic Resin 1

A total of 850 parts of xylene was placed in a 2-liter glass four-necked flask equipped with a thermometer, a stainless steel stirring rod, a flow-down condenser and a nitrogen introduction tube, and the temperature was raised to 150° C. after nitrogen replacement.

Styrene: 800 parts n-Butyl acrylate: 1000 parts

Monobutyl maleate: 50 parts

Dicumyl peroxide: 80 parts

Then, the mixture of the above materials was added dropwise from the dropping funnel over 4 h, followed by reaction at 150° C. for 4 h. Then, the temperature was raised to 200° C., and xylene was distilled off under reduced pressure to obtain a styrene acrylic resin 1.

Production of Calcium Carbonate Particles 1

Light calcium carbonate particles (number average particle diameter 400 nm): 100 parts Stearic acid: 2 parts The above materials were put into a Henschel mixer and stirred at 2000 rpm for 2 min, and then stirred at 100 rpm for 10 min while raising the temperature to 120° C. to obtain calcium carbonate particles 1.

Production of Calcium Carbonate Particles 2 to 13

Calcium carbonate particles 2 to 13 were obtained in the same manner as in the method for producing calcium carbonate particles 1 by changing the material to the light calcium carbonate particles having the average number diameter shown in Table 2 and changing the surface treatment material and the amounts.

TABLE 2

| Calcium carbonate particles | Number average particle diameter (nm) | Type of surface treatment agent | Amount of surface treatment agent (coated amount) (% by mass) |
|---|---|---|---|
| Calcium carbonate particles 1 | 400 | Stearic acid | 2 |
| Calcium carbonate particles 2 | 400 | Lauric acid | 2 |
| Calcium carbonate particles 3 | 400 | Stearic acid | 0.3 |
| Calcium carbonate particles 4 | 400 | Stearic acid | 4.5 |
| Calcium carbonate particles 5 | 400 | Stearic acid | 0.05 |
| Calcium carbonate particles 6 | 400 | Stearic acid | 6 |
| Calcium carbonate particles 7 | 200 | Stearic acid | 2 |
| Calcium carbonate particles 8 | 700 | Stearic acid | 2 |
| Calcium carbonate particles 9 | 160 | Stearic acid | 2 |
| Calcium carbonate particles 10 | 100 | Stearic acid | 2 |
| Calcium carbonate particles 11 | 1000 | Stearic acid | 2 |
| Calcium carbonate particles 12 | 130 | Stearic acid | 2 |
| Calcium carbonate particles 13 | 20 | Stearic acid | 2 |

Production of Cyan Pigment Masterbatch CM1

Cyan pigment (PB15: 3, SP value: 8.8 $((cal/cm^3)^{1/2})$): 20 parts
Calcium carbonate particles 1: 20 parts
Polyester resin 1: 60 parts The above materials were mixed using a Henschel mixer (FM-75 type, manufactured by Nippon Coke & Eng. Co., Ltd.) at a rotation speed of 20 $s^{-1}$ and a rotation time of 5 min, and then kneaded at 120° C. in a twin-screw kneader (PCM-30 type, manufactured by Ikegai Corp.). The obtained kneaded product was cooled and coarsely pulverized with a pin mill to a volume average particle diameter of 100 μm or less to obtain a coarsely pulverized product of cyan pigment masterbatch CM1.

Production of Cyan Pigment Masterbatches CM2 to CM25

Cyan pigment masterbatches CM2 to CM25 were obtained in the same manner as in the production of the cyan pigment masterbatch CM1 except that the materials were changed to those shown in Table 3.

TABLE 3

| Masterbatch No. | Polyester resin | Amount blended (parts by mass) | Calcium carbonate | Amount blended (parts by mass) | Pigment | Amount blended (parts by mass) |
|---|---|---|---|---|---|---|
| CM1 | Polyester resin 1 | 60 | Calcium carbonate 1 | 20 | PB15:3 | 20 |
| CM2 | Polyester resin 1 | 60 | Calcium carbonate 2 | 20 | PB15:3 | 20 |
| CM3 | Polyester resin 1 | 60 | Calcium carbonate 3 | 20 | PB15:3 | 20 |
| CM4 | Polyester resin 1 | 60 | Calcium carbonate 4 | 20 | PB15:3 | 20 |
| CM5 | Polyester resin 1 | 60 | Calcium carbonate 5 | 20 | PB15:3 | 20 |
| CM6 | Polyester resin 1 | 60 | Calcium carbonate 6 | 20 | PB15:3 | 20 |
| CM7 | Polyester resin 1 | 47 | Calcium carbonate 1 | 33 | PB15:3 | 20 |
| CM8 | Polyester resin 1 | 70 | Calcium carbonate 1 | 10 | PB15:3 | 20 |
| CM9 | Polyester resin 1 | 30 | Calcium carbonate 1 | 50 | PB15:3 | 20 |
| CM10 | Polyester resin 1 | 74 | Calcium carbonate 1 | 6 | PB15:3 | 20 |
| CM11 | Polyester resin 2 | 60 | Calcium carbonate 1 | 20 | PB15:3 | 20 |
| CM12 | Polyester resin 3 | 60 | Calcium carbonate 1 | 20 | PB15:3 | 20 |
| CM13 | Polyester resin 1 | 60 | Calcium carbonate 7 | 20 | PB15:3 | 20 |
| CM14 | Polyester resin 1 | 60 | Calcium carbonate 8 | 20 | PB15:3 | 20 |
| CM15 | Polyester resin 1 | 60 | Calcium carbonate 9 | 20 | PB15:3 | 20 |
| CM16 | Polyester resin 1 | 60 | Calcium carbonate 10 | 20 | PB15:3 | 20 |
| CM17 | Polyester resin 1 | 60 | Calcium carbonate 11 | 20 | PB15:3 | 20 |
| CM18 | Polyester resin 1 | 60 | Calcium carbonate 12 | 20 | PB15:3 | 20 |
| CM19 | Polyester resin 1 | 60 | Calcium carbonate 13 | 20 | PB15:3 | 20 |
| CM20 | Polyester resin 1 | 77 | Calcium carbonate 1 | 3 | PB15:3 | 20 |
| CM21 | Polyester resin 1 | 19 | Calcium carbonate 1 | 61 | PB15:3 | 20 |
| CM22 | Polyester resin 1 | 60 | Calcium carbonate without surface treatment | 20 | PB15:3 | 20 |
| CM23 | Polyester resin 4 | 60 | Calcium carbonate 1 | 20 | PB15:3 | 20 |
| CM24 | Polyester resin 5 | 60 | Calcium carbonate 1 | 20 | PB15:3 | 20 |
| CM25 | Polyester resin 1 | 55 | Calcium carbonate 1 | 5 | PB15:3 | 40 |

Production of Cyan Toner 1
  Polyester resin 1: 65 parts
  Styrene acrylic resin 1: 5 parts
  Pigment masterbatch CM1: 25 parts
  Synthetic wax 1: 5 parts
(Hydrocarbon Wax, Peak Temperature of Maximum Endothermic Peak 90° C.)

The above materials were mixed using a Henschel mixer (FM-75 type, manufactured by Nippon Coke & Eng. Co., Ltd.) at a rotation speed of 20 $s^{-1}$ and a rotation time of 5 min, and then kneaded at 140° C. in a twin-screw kneader (PCM-30 type, manufactured by Ikegai Corp.). The obtained kneaded product was cooled and coarsely pulverized with a pin mill to a volume average particle diameter of 100 μm or less to obtain a coarsely pulverized product. The obtained coarsely pulverized product was finely pulverized by a mechanical pulverizer (T-250, manufactured by Turbo Industries, Ltd.) by adjusting the rotation speed and the number of passes so as to obtain the target particle diameter.

Further, a rotary classifier (200TSP, manufactured by Hosokawa Micron Corp.) was used for classification to obtain toner particles. As for the operating conditions of the rotary classifier (200TSP, manufactured by Hosokawa Micron Corp.), the classification was performed by adjusting the number of revolutions so that the target particle diameter and particle size distribution could be obtained. The weight average particle diameter (D4) was 6.5 μm. To 100 parts of the obtained toner particles, 1.8 parts of silica fine particles having a specific surface area of 200 $m^2/g$ measured by the BET method and hydrophobized with silicone oil were added, and mixing was performed with a Henschel mixer (FM-75 type, manufactured by Nippon Coke & Eng. Co., Ltd.) at a rotation speed of 30 $s^{-1}$ and a rotation time of 10 min to obtain toner CT1.

Production Examples of Cyan Toners CT2 to CT31

Cyan toners CT2 to CT31 were obtained in the same manner as in the production of the cyan toner CT1 except that the material was changed to those shown in Tables 4-1 and 4-2.

TABLE 4-1

| Toner No. | Polyester resin | Amount blended (parts by mass) | Styrene-acrylic resin | Amount blended (parts by mass) | Cyan masterbatch | Amount blended (parts by mass) |
|---|---|---|---|---|---|---|
| CT1 | Polyester resin 1 | 65 | Styrene-acrylic resin 1 | 5 | CM1 | 25 |
| CT2 | Polyester resin 1 | 65 | Styrene-acrylic resin 1 | 5 | CM2 | 25 |
| CT3 | Polyester resin 1 | 65 | Styrene-acrylic resin 1 | 5 | CM3 | 25 |
| CT4 | Polyester resin 1 | 65 | Styrene-acrylic resin 1 | 5 | CM4 | 25 |
| CT5 | Polyester resin 1 | 65 | Styrene-acrylic resin 1 | 5 | CM5 | 25 |
| CT6 | Polyester resin 1 | 65 | Styrene-acrylic resin 1 | 5 | CM6 | 25 |
| CT7 | Polyester resin 1 | 65 | Styrene-acrylic resin 1 | 5 | CM7 | 25 |
| CT8 | Polyester resin 1 | 65 | Styrene-acrylic resin 1 | 5 | CM8 | 25 |
| CT9 | Polyester resin 1 | 65 | Styrene-acrylic resin 1 | 5 | CM9 | 25 |
| CT10 | Polyester resin 1 | 65 | Styrene-acrylic resin 1 | 5 | CM10 | 25 |
| CT11 | Polyester resin 1 | 69.5 | Styrene-acrylic resin 1 | 0.5 | CM1 | 25 |
| CT12 | Polyester resin 1 | 68 | Styrene-acrylic resin 1 | 2 | CM1 | 25 |
| CT13 | Polyester resin 1 | 48 | Styrene-acrylic resin 1 | 22 | CM1 | 25 |
| CT14 | Polyester resin 1 | 52 | Styrene-acrylic resin 1 | 18 | CM1 | 25 |
| CT15 | Polyester resin 2 | 65 | Styrene-acrylic resin 1 | 5 | CM11 | 25 |
| CT16 | Polyester resin 3 | 65 | Styrene-acrylic resin 1 | 5 | CM12 | 25 |
| CT17 | Polyester resin 1 | 70 | Styrene-acrylic resin 1 | 0 | CM1 | 25 |
| CT18 | Polyester resin 1 | 65 | Styrene-acrylic resin 1 | 5 | CM13 | 25 |
| CT19 | Polyester resin 1 | 65 | Styrene-acrylic resin 1 | 5 | CM14 | 25 |
| CT20 | Polyester resin 1 | 65 | Styrene-acrylic resin 1 | 5 | CM15 | 25 |
| CT21 | Polyester resin 1 | 65 | Styrene-acrylic resin 1 | 5 | CM16 | 25 |
| CT22 | Polyester resin 1 | 65 | Styrene-acrylic resin 1 | 5 | CM17 | 25 |
| CT23 | Polyester resin 1 | 65 | Styrene-acrylic resin 1 | 5 | CM18 | 25 |
| CT24 | Polyester resin 1 | 65 | Styrene-acrylic resin 1 | 5 | CM19 | 25 |
| CT25 | Polyester resin 1 | 65 | Styrene-acrylic resin 1 | 5 | CM20 | 25 |
| CT26 | Polyester resin 1 | 65 | Styrene-acrylic resin 1 | 5 | CM21 | 25 |
| CT27 | Polyester resin 1 | 65 | Styrene-acrylic resin 1 | 5 | CM22 | 25 |
| CT28 | Polyester resin 4 | 65 | Styrene-acrylic resin 1 | 5 | CM23 | 25 |
| CT29 | Polyester resin 5 | 65 | Styrene-acrylic resin 1 | 5 | CM24 | 25 |
| CT30 | Polyester resin 1 | 81 | Styrene-acrylic resin 2 | 5 | CM1 | 9 |
| CT31 | Polyester resin 1 | 45 | Styrene-acrylic resin 3 | 5 | CM25 | 45 |

TABLE 4-2

| Toner No. | Wax | Amount blended (parts by mass) | Amount of pigment in toner | Calcium carbonate amount (%) | A/B |
|---|---|---|---|---|---|
| CT1 | Synthetic wax 1 | 5 | 5.0 | 5.0 | 1.0 |
| CT2 | Synthetic wax 1 | 5 | 5.0 | 5.0 | 1.0 |
| CT3 | Synthetic wax 1 | 5 | 5.0 | 5.0 | 1.0 |
| CT4 | Synthetic wax 1 | 5 | 5.0 | 5.0 | 1.0 |
| CT5 | Synthetic wax 1 | 5 | 5.0 | 5.0 | 1.0 |
| CT6 | Synthetic wax 1 | 5 | 5.0 | 5.0 | 1.0 |
| CT7 | Synthetic wax 1 | 5 | 5.0 | 8.3 | 0.6 |
| CT8 | Synthetic wax 1 | 5 | 5.0 | 2.5 | 2.0 |
| CT9 | Synthetic wax 1 | 5 | 5.0 | 12.5 | 0.4 |
| CT10 | Synthetic wax 1 | 5 | 5.0 | 1.5 | 3.3 |
| CT11 | Synthetic wax 1 | 5 | 5.0 | 5.0 | 1.0 |
| CT12 | Synthetic wax 1 | 5 | 5.0 | 5.0 | 1.0 |
| CT13 | Synthetic wax 1 | 5 | 5.0 | 5.0 | 1.0 |
| CT14 | Synthetic wax 1 | 5 | 5.0 | 5.0 | 1.0 |
| CT15 | Synthetic wax 1 | 5 | 5.0 | 5.0 | 1.0 |
| CT16 | Synthetic wax 1 | 5 | 5.0 | 5.0 | 1.0 |
| CT17 | Synthetic wax 1 | 5 | 5.0 | 5.0 | 1.0 |
| CT18 | Synthetic wax 1 | 5 | 5.0 | 5.0 | 1.0 |
| CT19 | Synthetic wax 1 | 5 | 5.0 | 5.0 | 1.0 |
| CT20 | Synthetic wax 1 | 5 | 5.0 | 5.0 | 1.0 |
| CT21 | Synthetic wax 1 | 5 | 5.0 | 5.0 | 1.0 |
| CT22 | Synthetic wax 1 | 5 | 5.0 | 5.0 | 1.0 |
| CT23 | Synthetic wax 1 | 5 | 5.0 | 5.0 | 1.0 |
| CT24 | Synthetic wax 1 | 5 | 5.0 | 5.0 | 1.0 |
| CT25 | Synthetic wax 1 | 5 | 5.0 | 0.8 | 6.7 |
| CT26 | Synthetic wax 1 | 5 | 5.0 | 15.3 | 0.3 |
| CT27 | Synthetic wax 1 | 5 | 5.0 | 5.0 | 1.0 |
| CT28 | Synthetic wax 1 | 5 | 5.0 | 5.0 | 1.0 |
| CT29 | Synthetic wax 1 | 5 | 5.0 | 5.0 | 1.0 |
| CT30 | Synthetic wax 2 | 5 | 1.8 | 1.8 | 1.0 |
| CT31 | Synthetic wax 1 | 5 | 18.0 | 2.3 | 8.0 |

In the table, the calcium carbonate amount is the amount (% by mass) of calcium carbonate particles in the toner particles. A/B is a value of A/B when the amount of the colorant is A (% by mass) and the amount of the calcium carbonate particles is B (% by mass). The same applies to the table below.

Production of Magenta Pigment Masterbatch

Magenta pigment (PR122, SP value: 9.1 $(cal/cm^3)^{(1/2)}$): 20 parts

Calcium carbonate particles 1: 20 parts

Polyester resin 1: 60 parts

The above materials were mixed using a Henschel mixer (FM-75 type, manufactured by Nippon Coke & Eng. Co., Ltd.) at a rotation speed of 20 $s^{-1}$ and a rotation time of 5 min, and then kneaded at 120° C. in a twin-screw kneader (PCM-30 type, manufactured by Ikegai Corp.). The obtained kneaded product was cooled and coarsely pulverized with a pin mill to a volume average particle diameter of 100 µm or less to obtain a coarsely pulverized product of magenta pigment masterbatch MM1.

Production of Magenta Pigment Masterbatches MM2 to MM24

Magenta pigment masterbatches MM2 to MM24 were obtained in the same manner as in the production of the magenta pigment masterbatch MM1, except that the material was changed to those shown in Table 5.

TABLE 5

| Masterbatch No. | Polyester resin | Amount blended (parts) | Calcium carbonate | Amount blended (parts) | Pigment | Amount blended (parts) |
|---|---|---|---|---|---|---|
| MM1 | Polyester resin 1 | 60 | Calcium carbonate 1 | 20 | PR122 | 20 |
| MM2 | Polyester resin 1 | 60 | Calcium carbonate 2 | 20 | PR122 | 20 |
| MM3 | Polyester resin 1 | 60 | Calcium carbonate 3 | 20 | PR122 | 20 |
| MM4 | Polyester resin 1 | 60 | Calcium carbonate 4 | 20 | PR122 | 20 |
| MM5 | Polyester resin 1 | 60 | Calcium carbonate 5 | 20 | PR122 | 20 |
| MM6 | Polyester resin 1 | 60 | Calcium carbonate 6 | 20 | PR122 | 20 |
| MM7 | Polyester resin 1 | 47 | Calcium carbonate 1 | 33 | PR122 | 20 |
| MM8 | Polyester resin 1 | 70 | Calcium carbonate 1 | 10 | PR122 | 20 |
| MM9 | Polyester resin 1 | 30 | Calcium carbonate 1 | 50 | PR122 | 20 |
| MM10 | Polyester resin 1 | 74 | Calcium carbonate 1 | 6 | PR122 | 20 |
| MM11 | Polyester resin 2 | 60 | Calcium carbonate 1 | 20 | PR122 | 20 |
| MM12 | Polyester resin 3 | 60 | Calcium carbonate 1 | 20 | PR122 | 20 |
| MM13 | Polyester resin 1 | 60 | Calcium carbonate 7 | 20 | PR122 | 20 |
| MM14 | Polyester resin 1 | 60 | Calcium carbonate 8 | 20 | PR122 | 20 |
| MM15 | Polyester resin 1 | 60 | Calcium carbonate 9 | 20 | PR122 | 20 |
| MM16 | Polyester resin 1 | 60 | Calcium carbonate 10 | 20 | PR122 | 20 |
| MM17 | Polyester resin 1 | 60 | Calcium carbonate 11 | 20 | PR122 | 20 |
| MM18 | Polyester resin 1 | 60 | Calcium carbonate 12 | 20 | PR122 | 20 |
| MM19 | Polyester resin 1 | 60 | Calcium carbonate 13 | 20 | PR122 | 20 |
| MM20 | Polyester resin 1 | 77 | Calcium carbonate 1 | 3 | PR122 | 20 |
| MM21 | Polyester resin 1 | 19 | Calcium carbonate 1 | 61 | PR122 | 20 |
| MM22 | Polyester resin 1 | 60 | Calcium carbonate without surface treatment | 20 | PR122 | 20 |
| MM23 | Polyester resin 4 | 60 | Calcium carbonate 1 | 20 | PR122 | 20 |
| MM24 | Polyester resin 5 | 60 | Calcium carbonate 1 | 20 | PR122 | 20 |

Production of Magenta Toner MT1
  Polyester resin 1: 65 parts
  Styrene acrylic resin 1: 5 parts
  Pigment masterbatch MM1: 25 parts
  Synthetic wax 1: 5 parts
(Hydrocarbon Wax, Peak Temperature of Maximum Endothermic Peak 90° C.)

The above materials were mixed using a Henschel mixer (FM-75 type, manufactured by Nippon Coke & Eng. Co., Ltd.) at a rotation speed of 20 s$^{-1}$ and a rotation time of 5 min, and then kneaded at 140° C. in a twin-screw kneader (PCM-30 type, manufactured by Ikegai Corp.). The obtained kneaded product was cooled and coarsely pulverized with a pin mill to a volume average particle diameter of 100 µm or less to obtain a coarsely pulverized product. The obtained coarsely pulverized product was finely pulverized by a mechanical pulverizer (T-250, manufactured by Turbo Industries, Ltd.) by adjusting the rotation speed and the number of passes so as to obtain the target particle diameter. Further, a rotary classifier (200TSP, manufactured by Hosokawa Micron Corp.) was used for classification to obtain toner particles. As for the operating conditions of the rotary classifier (200TSP, manufactured by Hosokawa Micron Corp.), the classification was performed by adjusting the number of revolutions so that the target particle diameter and particle size distribution could be obtained. The weight average particle diameter (D4) was 6.6 µm. To 100 parts of the obtained toner particles, 1.8 parts of silica fine particles having a specific surface area of 200 m$^2$/g measured by the BET method and hydrophobized with silicone oil were added, and mixing was performed with a Henschel mixer (FM-75 type, manufactured by Nippon Coke & Eng. Co., Ltd.) at a rotation speed of 30 s$^{-1}$ and a rotation time of 10 min to obtain toner MT1.

Production Examples of Magenta Toners MT2 to MT29

Magenta toners MT2 to MT29 were obtained in the same manner as in the production of the cyan toner MT1 except that the material was changed to those shown in Tables 6-1 and 6-2.

TABLE 6-1

| Toner No. | Polyester resin | Amount blended (parts) | Styrene-acrylic resin | Amount blended (parts) |
|---|---|---|---|---|
| MT1 | Polyester resin 1 | 65 | Styrene-acrylic resin 1 | 5 |
| MT2 | Polyester resin 1 | 65 | Styrene-acrylic resin 1 | 5 |
| MT3 | Polyester resin 1 | 65 | Styrene-acrylic resin 1 | 5 |
| MT4 | Polyester resin 1 | 65 | Styrene-acrylic resin 1 | 5 |
| MT5 | Polyester resin 1 | 65 | Styrene-acrylic resin 1 | 5 |
| MT6 | Polyester resin 1 | 65 | Styrene-acrylic resin 1 | 5 |
| MT7 | Polyester resin 1 | 65 | Styrene-acrylic resin 1 | 5 |
| MT8 | Polyester resin 1 | 65 | Styrene-acrylic resin 1 | 5 |
| MT9 | Polyester resin 1 | 65 | Styrene-acrylic resin 1 | 5 |
| MT10 | Polyester resin 1 | 65 | Styrene-acrylic resin 1 | 5 |
| MT11 | Polyester resin 1 | 69.5 | Styrene-acrylic resin 1 | 0.5 |
| MT12 | Polyester resin 1 | 68 | Styrene-acrylic resin 1 | 2 |
| MT13 | Polyester resin 1 | 48 | Styrene-acrylic resin 1 | 22 |
| MT14 | Polyester resin 1 | 52 | Styrene-acrylic resin 1 | 18 |
| MT15 | Polyester resin 2 | 65 | Styrene-acrylic resin 1 | 5 |
| MT16 | Polyester resin 3 | 65 | Styrene-acrylic resin 1 | 5 |
| MT17 | Polyester resin 1 | 70 | Styrene-acrylic resin 1 | 0 |
| MT18 | Polyester resin 1 | 65 | Styrene-acrylic resin 1 | 5 |
| MT19 | Polyester resin 1 | 65 | Styrene-acrylic resin 1 | 5 |
| MT20 | Polyester resin 1 | 65 | Styrene-acrylic resin 1 | 5 |
| MT21 | Polyester resin 1 | 65 | Styrene-acrylic resin 1 | 5 |
| MT22 | Polyester resin 1 | 65 | Styrene-acrylic resin 1 | 5 |
| MT23 | Polyester resin 1 | 65 | Styrene-acrylic resin 1 | 5 |
| MT24 | Polyester resin 1 | 65 | Styrene-acrylic resin 1 | 5 |
| MT25 | Polyester resin 1 | 65 | Styrene-acrylic resin 1 | 5 |
| MT26 | Polyester resin 1 | 65 | Styrene-acrylic resin 1 | 5 |
| MT27 | Polyester resin 1 | 65 | Styrene-acrylic resin 1 | 5 |
| MT28 | Polyester resin 4 | 65 | Styrene-acrylic resin 1 | 5 |
| MT29 | Polyester resin 5 | 65 | Styrene-acrylic resin 1 | 5 |

TABLE 6-2

| Toner No. | Magenta masterbatch | Amount blended (parts) | Wax | Amount blended (parts) | Calcium carbonate amount (%) | A/B |
|---|---|---|---|---|---|---|
| MT1 | MM1 | 25 | Synthetic wax 1 | 5 | 5.0 | 1.0 |
| MT2 | MM2 | 25 | Synthetic wax 1 | 5 | 5.0 | 1.0 |
| MT3 | MM3 | 25 | Synthetic wax 1 | 5 | 5.0 | 1.0 |
| MT4 | MM4 | 25 | Synthetic wax 1 | 5 | 5.0 | 1.0 |
| MT5 | MM5 | 25 | Synthetic wax 1 | 5 | 5.0 | 1.0 |
| MT6 | MM6 | 25 | Synthetic wax 1 | 5 | 5.0 | 1.0 |
| MT7 | MM7 | 25 | Synthetic wax 1 | 5 | 8.3 | 0.6 |
| MT8 | MM8 | 25 | Synthetic wax 1 | 5 | 2.5 | 2.0 |
| MT9 | MM9 | 25 | Synthetic wax 1 | 5 | 12.5 | 0.4 |
| MT10 | MM10 | 25 | Synthetic wax 1 | 5 | 1.5 | 3.3 |
| MT11 | MM1 | 25 | Synthetic wax 1 | 5 | 5.0 | 1.0 |
| MT12 | MM1 | 25 | Synthetic wax 1 | 5 | 5.0 | 1.0 |
| MT13 | MM1 | 25 | Synthetic wax 1 | 5 | 5.0 | 1.0 |
| MT14 | MM1 | 25 | Synthetic wax 1 | 5 | 5.0 | 1.0 |
| MT15 | MM11 | 25 | Synthetic wax 1 | 5 | 5.0 | 1.0 |
| MT16 | MM12 | 25 | Synthetic wax 1 | 5 | 5.0 | 1.0 |
| MT17 | MM1 | 25 | Synthetic wax 1 | 5 | 5.0 | 1.0 |
| MT18 | MM13 | 25 | Synthetic wax 1 | 5 | 5.0 | 1.0 |
| MT19 | MM14 | 25 | Synthetic wax 1 | 5 | 5.0 | 1.0 |
| MT20 | MM15 | 25 | Synthetic wax 1 | 5 | 5.0 | 1.0 |
| MT21 | MM16 | 25 | Synthetic wax 1 | 5 | 5.0 | 1.0 |
| MT22 | MM17 | 25 | Synthetic wax 1 | 5 | 5.0 | 1.0 |
| MT23 | MM18 | 25 | Synthetic wax 1 | 5 | 5.0 | 1.0 |
| MT24 | MM19 | 25 | Synthetic wax 1 | 5 | 5.0 | 1.0 |
| MT25 | MM20 | 25 | Synthetic wax 1 | 5 | 0.8 | 6.7 |
| MT26 | MM21 | 25 | Synthetic wax 1 | 5 | 15.3 | 0.3 |

TABLE 6-2-continued

| Toner No. | Magenta masterbatch | Amount blended (parts) | Wax | Amount blended (parts) | Calcium carbonate amount (%) | A/B |
|---|---|---|---|---|---|---|
| MT27 | MM22 | 25 | Synthetic wax 1 | 5 | 5.0 | 1.0 |
| MT28 | MM23 | 25 | Synthetic wax 1 | 5 | 5.0 | 1.0 |
| MT29 | MM24 | 25 | Synthetic wax 1 | 5 | 5.0 | 1.0 |

Production of Yellow Pigment Masterbatch YM1
  Yellow pigment (PY180, SP value: 9.3 $(cal/cm^3)^{(1/2)}$): 20 parts
  Calcium carbonate particles 1: 20 parts
  Polyester resin 1: 60 parts
  The above materials were mixed using a Henschel mixer (FM-75 type, manufactured by Nippon Coke & Eng. Co., Ltd.) at a rotation speed of 20 $s^{-1}$ and a rotation time of 5 min, and then kneaded at 120° C. in a twin-screw kneader (PCM-30 type, manufactured by Ikegai Corp.). The obtained kneaded product was cooled and coarsely pulverized with a pin mill to a volume average particle diameter of 100 μm or less to obtain a coarsely pulverized product of magenta pigment masterbatch YM1.

Production of Yellow Pigment Masterbatches YM2 to YM24
  Yellow pigment masterbatches YM2 to YM24 were obtained in the same manner as in the production of the yellow pigment masterbatch YM1, except that the material was changed to those shown in Table 7.

TABLE 7

| Masterbatch No. | Polyester resin | Amount blended (parts) | Calcium carbonate | Amount blended (parts) | Pigment | Amount blended (parts) |
|---|---|---|---|---|---|---|
| YM1 | Polyester resin 1 | 60 | Calcium carbonate 1 | 20 | PY180 | 20 |
| YM2 | Polyester resin 1 | 60 | Calcium carbonate 2 | 20 | PY180 | 20 |
| YM3 | Polyester resin 1 | 60 | Calcium carbonate 3 | 20 | PY180 | 20 |
| YM4 | Polyester resin 1 | 60 | Calcium carbonate 4 | 20 | PY180 | 20 |
| YM5 | Polyester resin 1 | 60 | Calcium carbonate 5 | 20 | PY180 | 20 |
| YM6 | Polyester resin 1 | 60 | Calcium carbonate 6 | 20 | PY180 | 20 |
| YM7 | Polyester resin 1 | 47 | Calcium carbonate 1 | 33 | PY180 | 20 |
| YM8 | Polyester resin 1 | 70 | Calcium carbonate 1 | 10 | PY180 | 20 |
| YM9 | Polyester resin 1 | 30 | Calcium carbonate 1 | 50 | PY180 | 20 |
| YM10 | Polyester resin 1 | 74 | Calcium carbonate 1 | 6 | PY180 | 20 |
| YM11 | Polyester resin 2 | 60 | Calcium carbonate 1 | 20 | PY180 | 20 |
| YM12 | Polyester resin 3 | 60 | Calcium carbonate 1 | 20 | PY180 | 20 |
| YM13 | Polyester resin 1 | 60 | Calcium carbonate 7 | 20 | PY180 | 20 |
| YM14 | Polyester resin 1 | 60 | Calcium carbonate 8 | 20 | PY180 | 20 |
| YM15 | Polyester resin 1 | 60 | Calcium carbonate 9 | 20 | PY180 | 20 |
| YM16 | Polyester resin 1 | 60 | Calcium carbonate 10 | 20 | PY180 | 20 |
| YM17 | Polyester resin 1 | 60 | Calcium carbonate 11 | 20 | PY180 | 20 |
| YM18 | Polyester resin 1 | 60 | Calcium carbonate 12 | 20 | PY180 | 20 |
| YM19 | Polyester resin 1 | 60 | Calcium carbonate 13 | 20 | PY180 | 20 |
| YM20 | Polyester resin 1 | 77 | Calcium carbonate 1 | 3 | PY180 | 20 |
| YM21 | Polyester resin 1 | 19 | Calcium carbonate 1 | 61 | PY180 | 20 |
| YM22 | Polyester resin 1 | 60 | Calcium carbonate without surface treatment | 20 | PY180 | 20 |
| YM23 | Polyester resin 4 | 60 | Calcium carbonate 1 | 20 | PY180 | 20 |
| YM24 | Polyester resin 5 | 60 | Calcium carbonate 1 | 20 | PY180 | 20 |

Production of Yellow Toner YT1
  Polyester resin 1: 65 parts
  Styrene acrylic resin 1: 5 parts
  Pigment masterbatch YM1: 25 parts
  Synthetic wax 1: 5 parts
  (Hydrocarbon Wax, Peak Temperature of Maximum Endothermic Peak 90° C.)
  The above materials were mixed using a Henschel mixer (FM-75 type, manufactured by Nippon Coke & Eng. Co., Ltd.) at a rotation speed of 20 $s^{-1}$ and a rotation time of 5 min, and then kneaded at 140° C. in a twin-screw kneader (PCM-30 type, manufactured by Ikegai Corp.). The obtained kneaded product was cooled and coarsely pulverized with a pin mill to a volume average particle diameter of 100 μm or less to obtain a coarsely pulverized product. The obtained coarsely pulverized product was finely pulverized by a mechanical pulverizer (T-250, manufactured by Turbo Industries, Ltd.) by adjusting the rotation speed and the number of passes so as to obtain the target particle diameter. Further, a rotary classifier (200TSP, manufactured by Hosokawa Micron Corp.) was used for classification to obtain toner particles. As for the operating conditions of the rotary classifier (200TSP, manufactured by Hosokawa Micron Corp.), the classification was performed by adjusting the number of revolutions so that the target particle diameter and particle size distribution could be obtained. The weight average particle diameter (D4) was 6.5 μm. To 100 parts of the obtained toner particles, 1.8 parts of silica fine particles having a specific surface area of 200 m$^2$/g measured by the BET method and hydrophobized with silicone oil were added, and mixing was performed with a Henschel mixer (FM-75 type, manufactured by Nippon Coke & Eng. Co., Ltd.) at a rotation speed of 30 s$^{-1}$ and a rotation time of 10 min to obtain toner YT1.

Production Examples of Yellow Toners YT2 to YT29

Yellow toners YT2 to YT29 were obtained in the same manner as in the production of the yellow toner YT1 except that the material was changed to those shown in Tables 8-1 and 8-2.

TABLE 8-1

| Toner No. | Polyester resin | Amount blended (parts) | Styrene-acrylic resin | Amount blended (parts) | Yellow masterbatch | Amount blended (parts) |
|---|---|---|---|---|---|---|
| YT1 | Polyester resin 1 | 65 | Styrene-acrylic resin 1 | 5 | YM1 | 25 |
| YT2 | Polyester resin 1 | 65 | Styrene-acrylic resin 1 | 5 | YM2 | 25 |
| YT3 | Polyester resin 1 | 65 | Styrene-acrylic resin 1 | 5 | YM3 | 25 |
| YT4 | Polyester resin 1 | 65 | Styrene-acrylic resin 1 | 5 | YM4 | 25 |
| YT5 | Polyester resin 1 | 65 | Styrene-acrylic resin 1 | 5 | YM5 | 25 |
| YT6 | Polyester resin 1 | 65 | Styrene-acrylic resin 1 | 5 | YM6 | 25 |
| YT7 | Polyester resin 1 | 65 | Styrene-acrylic resin 1 | 5 | YM7 | 25 |
| YT8 | Polyester resin 1 | 65 | Styrene-acrylic resin 1 | 5 | YM8 | 25 |
| YT9 | Polyester resin 1 | 65 | Styrene-acrylic resin 1 | 5 | YM9 | 25 |
| YT10 | Polyester resin 1 | 65 | Styrene-acrylic resin 1 | 5 | YM10 | 25 |
| YT11 | Polyester resin 1 | 69.5 | Styrene-acrylic resin 1 | 0.5 | YM1 | 25 |
| YT12 | Polyester resin 1 | 68 | Styrene-acrylic resin 1 | 2 | YM1 | 25 |
| YT13 | Polyester resin 1 | 48 | Styrene-acrylic resin 1 | 22 | YM1 | 25 |
| YT14 | Polyester resin 1 | 52 | Styrene-acrylic resin 1 | 18 | YM1 | 25 |
| YT15 | Polyester resin 2 | 65 | Styrene-acrylic resin 1 | 5 | YM11 | 25 |
| YT16 | Polyester resin 3 | 65 | Styrene-acrylic resin 1 | 5 | YM12 | 25 |
| YT17 | Polyester resin 1 | 70 | Styrene-acrylic resin 1 | 0 | YM1 | 25 |
| YT18 | Polyester resin 1 | 65 | Styrene-acrylic resin 1 | 5 | YM13 | 25 |
| YT19 | Polyester resin 1 | 65 | Styrene-acrylic resin 1 | 5 | YM14 | 25 |
| YT20 | Polyester resin 1 | 65 | Styrene-acrylic resin 1 | 5 | YM15 | 25 |
| YT21 | Polyester resin 1 | 65 | Styrene-acrylic resin 1 | 5 | YM16 | 25 |
| YT22 | Polyester resin 1 | 65 | Styrene-acrylic resin 1 | 5 | YM17 | 25 |
| YT23 | Polyester resin 1 | 65 | Styrene-acrylic resin 1 | 5 | YM18 | 25 |
| YT24 | Polyester resin 1 | 65 | Styrene-acrylic resin 1 | 5 | YM19 | 25 |
| YT25 | Polyester resin 1 | 65 | Styrene-acrylic resin 1 | 5 | YM20 | 25 |
| YT26 | Polyester resin 1 | 65 | Styrene-acrylic resin 1 | 5 | YM21 | 25 |
| YT27 | Polyester resin 1 | 65 | Styrene-acrylic resin 1 | 5 | YM22 | 25 |
| YT28 | Polyester resin 4 | 65 | Styrene-acrylic resin 1 | 5 | YM23 | 25 |
| YT29 | Polyester resin 5 | 65 | Styrene-acrylic resin 1 | 5 | YM24 | 25 |

TABLE 8-2

| Toner No. | Wax | Amount blended (parts) | Calcium carbonate amount (%) | A/B |
|---|---|---|---|---|
| YT1 | Synthetic wax 1 | 5 | 5.0 | 1.0 |
| YT2 | Synthetic wax 1 | 5 | 5.0 | 1.0 |
| YT3 | Synthetic wax 1 | 5 | 5.0 | 1.0 |
| YT4 | Synthetic wax 1 | 5 | 5.0 | 1.0 |
| YT5 | Synthetic wax 1 | 5 | 5.0 | 1.0 |
| YT6 | Synthetic wax 1 | 5 | 5.0 | 1.0 |
| YT7 | Synthetic wax 1 | 5 | 8.3 | 0.6 |
| YT8 | Synthetic wax 1 | 5 | 2.5 | 2.0 |
| YT9 | Synthetic wax 1 | 5 | 12.5 | 0.4 |
| YT10 | Synthetic wax 1 | 5 | 1.5 | 3.3 |
| YT11 | Synthetic wax 1 | 5 | 5.0 | 1.0 |
| YT12 | Synthetic wax 1 | 5 | 5.0 | 1.0 |
| YT13 | Synthetic wax 1 | 5 | 5.0 | 1.0 |
| YT14 | Synthetic wax 1 | 5 | 5.0 | 1.0 |
| YT15 | Synthetic wax 1 | 5 | 5.0 | 1.0 |
| YT16 | Synthetic wax 1 | 5 | 5.0 | 1.0 |
| YT17 | Synthetic wax 1 | 5 | 5.0 | 1.0 |
| YT18 | Synthetic wax 1 | 5 | 5.0 | 1.0 |
| YT19 | Synthetic wax 1 | 5 | 5.0 | 1.0 |
| YT20 | Synthetic wax 1 | 5 | 5.0 | 1.0 |
| YT21 | Synthetic wax 1 | 5 | 5.0 | 1.0 |
| YT22 | Synthetic wax 1 | 5 | 5.0 | 1.0 |
| YT23 | Synthetic wax 1 | 5 | 5.0 | 1.0 |
| YT24 | Synthetic wax 1 | 5 | 5.0 | 1.0 |
| YT25 | Synthetic wax 1 | 5 | 0.8 | 6.7 |
| YT26 | Synthetic wax 1 | 5 | 15.3 | 0.3 |
| YT27 | Synthetic wax 1 | 5 | 5.0 | 1.0 |
| YT28 | Synthetic wax 1 | 5 | 5.0 | 1.0 |
| YT29 | Synthetic wax 1 | 5 | 5.0 | 1.0 |

Production of Yellow Pigment Masterbatch YM25

Yellow pigment (PY74, SP value: 9.2 (cal/cm$^3$)$^{(1/2)}$): 20 parts

Calcium carbonate particles 1: 20 parts

Polyester resin 1: 60 parts

The above materials were mixed using a Henschel mixer (FM-75 type, manufactured by Nippon Coke & Eng. Co., Ltd.) at a rotation speed of 20 s$^{-1}$ and a rotation time of 5 min, and then kneaded at 120° C. in a twin-screw kneader (PCM-30 type, manufactured by Ikegai Corp.). The obtained kneaded product was cooled and coarsely pulverized with a pin mill to a volume average particle diameter of 100 μm or less to obtain a coarsely pulverized product of magenta pigment masterbatch YM425.

Production of Yellow Pigment Masterbatches YM26 to YM48

Yellow pigment masterbatches YM26 to YM48 were obtained in the same manner as in the production of the yellow pigment masterbatch YM25, except that the material was changed to those shown in Table 9.

TABLE 9

| Masterbatch No. | Polyester resin | Amount blended (parts) | Calcium carbonate | Amount blended (parts) | Pigment | Amount blended (parts) |
|---|---|---|---|---|---|---|
| YM25 | Polyester resin 1 | 60 | Calcium carbonate 1 | 20 | PY74 | 20 |
| YM26 | Polyester resin 1 | 60 | Calcium carbonate 2 | 20 | PY74 | 20 |
| YM27 | Polyester resin 1 | 60 | Calcium carbonate 3 | 20 | PY74 | 20 |
| YM28 | Polyester resin 1 | 60 | Calcium carbonate 4 | 20 | PY74 | 20 |
| YM29 | Polyester resin 1 | 60 | Calcium carbonate 5 | 20 | PY74 | 20 |
| YM30 | Polyester resin 1 | 60 | Calcium carbonate 6 | 20 | PY74 | 20 |
| YM31 | Polyester resin 1 | 47 | Calcium carbonate 1 | 33 | PY74 | 20 |
| YM32 | Polyester resin 1 | 70 | Calcium carbonate 1 | 10 | PY74 | 20 |
| YM33 | Polyester resin 1 | 30 | Calcium carbonate 1 | 50 | PY74 | 20 |
| YM34 | Polyester resin 1 | 74 | Calcium carbonate 1 | 6 | PY74 | 20 |
| YM35 | Polyester resin 2 | 60 | Calcium carbonate 1 | 20 | PY74 | 20 |
| YM36 | Polyester resin 3 | 60 | Calcium carbonate 1 | 20 | PY74 | 20 |
| YM37 | Polyester resin 1 | 60 | Calcium carbonate 7 | 20 | PY74 | 20 |
| YM38 | Polyester resin 1 | 60 | Calcium carbonate 8 | 20 | PY74 | 20 |
| YM39 | Polyester resin 1 | 60 | Calcium carbonate 9 | 20 | PY74 | 20 |
| YM40 | Polyester resin 1 | 60 | Calcium carbonate 10 | 20 | PY74 | 20 |
| YM41 | Polyester resin 1 | 60 | Calcium carbonate 11 | 20 | PY74 | 20 |
| YM42 | Polyester resin 1 | 60 | Calcium carbonate 12 | 20 | PY74 | 20 |
| YM43 | Polyester resin 1 | 60 | Calcium carbonate 13 | 20 | PY74 | 20 |
| YM44 | Polyester resin 1 | 77 | Calcium carbonate 1 | 3 | PY74 | 20 |
| YM45 | Polyester resin 1 | 19 | Calcium carbonate 1 | 61 | PY74 | 20 |
| YM46 | Polyester resin 1 | 60 | Calcium carbonate without surface treatment | 20 | PY74 | 20 |
| YM47 | Polyester resin 4 | 60 | Calcium carbonate 1 | 20 | PY74 | 20 |
| YM48 | Polyester resin 5 | 60 | Calcium carbonate 1 | 20 | PY74 | 20 |

Production Examples of Yellow Toners YT30 to YT58

Yellow toners YT30 to YT58 were obtained in the same manner as in the production of the yellow toner YT1 except that the material was changed to those shown in Tables 10-1 and 10-2.

TABLE 10-1

| Toner No. | Polyester resin | Amount blended (parts) | Styrene-acrylic resin | Amount blended (parts) | Yellow masterbatch | Amount blended (parts) |
|---|---|---|---|---|---|---|
| YT30 | Polyester resin 1 | 65 | Styrene-acrylic resin 1 | 5 | YM25 | 25 |
| YT31 | Polyester resin 1 | 65 | Styrene-acrylic resin 1 | 5 | YM26 | 25 |
| YT32 | Polyester resin 1 | 65 | Styrene-acrylic resin 1 | 5 | YM27 | 25 |
| YT33 | Polyester resin 1 | 65 | Styrene-acrylic resin 1 | 5 | YM28 | 25 |
| YT34 | Polyester resin 1 | 65 | Styrene-acrylic resin 1 | 5 | YM29 | 25 |
| YT35 | Polyester resin 1 | 65 | Styrene-acrylic resin 1 | 5 | YM30 | 25 |
| YT36 | Polyester resin 1 | 65 | Styrene-acrylic resin 1 | 5 | YM31 | 25 |
| YT37 | Polyester resin 1 | 65 | Styrene-acrylic resin 1 | 5 | YM32 | 25 |
| YT38 | Polyester resin 1 | 65 | Styrene-acrylic resin 1 | 5 | YM33 | 25 |
| YT39 | Polyester resin 1 | 65 | Styrene-acrylic resin 1 | 5 | YM34 | 25 |
| YT40 | Polyester resin 1 | 69.5 | Styrene-acrylic resin 1 | 0.5 | YM25 | 25 |
| YT41 | Polyester resin 1 | 68 | Styrene-acrylic resin 1 | 2 | YM25 | 25 |
| YT42 | Polyester resin 1 | 48 | Styrene-acrylic resin 1 | 22 | YM25 | 25 |
| YT43 | Polyester resin 1 | 52 | Styrene-acrylic resin 1 | 18 | YM25 | 25 |
| YT44 | Polyester resin 2 | 65 | Styrene-acrylic resin 1 | 5 | YM35 | 25 |
| YT45 | Polyester resin 3 | 65 | Styrene-acrylic resin 1 | 5 | YM36 | 25 |
| YT46 | Polyester resin 1 | 70 | Styrene-acrylic resin 1 | 0 | YM25 | 25 |
| YT47 | Polyester resin 1 | 65 | Styrene-acrylic resin 1 | 5 | YM37 | 25 |
| YT48 | Polyester resin 1 | 65 | Styrene-acrylic resin 1 | 5 | YM38 | 25 |
| YT49 | Polyester resin 1 | 65 | Styrene-acrylic resin 1 | 5 | YM39 | 25 |
| YT50 | Polyester resin 1 | 65 | Styrene-acrylic resin 1 | 5 | YM40 | 25 |
| YT51 | Polyester resin 1 | 65 | Styrene-acrylic resin 1 | 5 | YM41 | 25 |
| YT52 | Polyester resin 1 | 65 | Styrene-acrylic resin 1 | 5 | YM42 | 25 |

TABLE 10-1-continued

| Toner No. | Polyester resin | Amount blended (parts) | Styrene-acrylic resin | Amount blended (parts) | Yellow masterbatch | Amount blended (parts) |
|---|---|---|---|---|---|---|
| YT53 | Polyester resin 1 | 65 | Styrene-acrylic resin 1 | 5 | YM43 | 25 |
| YT54 | Polyester resin 1 | 65 | Styrene-acrylic resin 1 | 5 | YM44 | 25 |
| YT55 | Polyester resin 1 | 65 | Styrene-acrylic resin 1 | 5 | YM45 | 25 |
| YT56 | Polyester resin 1 | 65 | Styrene-acrylic resin 1 | 5 | YM46 | 25 |
| YT57 | Polyester resin 4 | 65 | Styrene-acrylic resin 1 | 5 | YM47 | 25 |
| YT58 | Polyester resin 5 | 65 | Styrene-acrylic resin 1 | 5 | YM48 | 25 |

TABLE 10-2

| Toner No. | Wax | Amount blended (parts) | Calcium carbonate amount (%) | A/B |
|---|---|---|---|---|
| YT30 | Synthetic wax 1 | 5 | 5.0 | 1.0 |
| YT31 | Synthetic wax 1 | 5 | 5.0 | 1.0 |
| YT32 | Synthetic wax 1 | 5 | 5.0 | 1.0 |
| YT33 | Synthetic wax 1 | 5 | 5.0 | 1.0 |
| YT34 | Synthetic wax 1 | 5 | 5.0 | 1.0 |
| YT35 | Synthetic wax 1 | 5 | 5.0 | 1.0 |
| YT36 | Synthetic wax 1 | 5 | 8.3 | 0.6 |
| YT37 | Synthetic wax 1 | 5 | 2.5 | 2.0 |
| YT38 | Synthetic wax 1 | 5 | 12.5 | 0.4 |
| YT39 | Synthetic wax 1 | 5 | 1.5 | 3.3 |
| YT40 | Synthetic wax 1 | 5 | 5.0 | 1.0 |
| YT41 | Synthetic wax 1 | 5 | 5.0 | 1.0 |
| YT42 | Synthetic wax 1 | 5 | 5.0 | 1.0 |
| YT43 | Synthetic wax 1 | 5 | 5.0 | 1.0 |
| YT44 | Synthetic wax 1 | 5 | 5.0 | 1.0 |
| YT45 | Synthetic wax 1 | 5 | 5.0 | 1.0 |
| YT46 | Synthetic wax 1 | 5 | 5.0 | 1.0 |
| YT47 | Synthetic wax 1 | 5 | 5.0 | 1.0 |
| YT48 | Synthetic wax 1 | 5 | 5.0 | 1.0 |
| YT49 | Synthetic wax 1 | 5 | 5.0 | 1.0 |
| YT50 | Synthetic wax 1 | 5 | 5.0 | 1.0 |
| YT51 | Synthetic wax 1 | 5 | 5.0 | 1.0 |
| YT52 | Synthetic wax 1 | 5 | 5.0 | 1.0 |
| YT53 | Synthetic wax 1 | 5 | 5.0 | 1.0 |
| YT54 | Synthetic wax 1 | 5 | 0.8 | 6.7 |
| YT55 | Synthetic wax 1 | 5 | 15.3 | 0.3 |
| YT56 | Synthetic wax 1 | 5 | 5.0 | 1.0 |
| YT57 | Synthetic wax 1 | 5 | 5.0 | 1.0 |
| YT58 | Synthetic wax 1 | 5 | 5.0 | 1.0 |

Production Example of Magnetic Carrier 1

Magnetite 1 having a number average particle diameter of 0.30 μm (magnetization strength of 65 Am$^2$/kg under a magnetic field of 1000/4π (kA/m))

Magnetite 2 having a number average particle diameter of 0.50 μm (magnetization strength of 65 Am$^2$/kg under a magnetic field of 1000/4π (kA/m))

A total of 4.0 parts of a silane compound (3-(2-aminoethylaminopropyl) trimethoxysilane) was added to 100 parts of each of the above materials, and the components were mixed and stirred at a high speed and at 100° C. or higher in a container to obtain fine particles of each type.

Phenol: 10% by mass

Formaldehyde solution: 6% by mass (formaldehyde 40% by mass, methanol 10% by mass, water 50% by mass)

Magnetite 1 treated with the silane compound: 58% by mass

Magnetite 2 treated with the silane compound: 26% by mass

A total of 100 parts of the above materials, 5 parts of a 28% by mass ammonia aqueous solution, and 20 parts of water were placed in a flask, the temperature was raised to 85° C. in 30 min and maintained while stirring and mixing, the polymerization reaction was carried out for 3 h, and the generated phenol resin was cured. Then, the cured phenol resin was cooled to 30° C., water was further added, the supernatant was removed, and the precipitate was washed with water, and then air-dried. Then, drying was performed under reduced pressure (5 mm Hg or less) at a temperature of 60° C. to obtain a magnetic body dispersion type spherical magnetic carrier 1. The volume-based 50% particle diameter (D50) of the magnetic carrier 1 was 34.2 μm.

Production Example of Cyan Two-Component Developer CD1

A total of 8.0 parts of cyan toner CT1 was added to 92.0 parts of the magnetic carrier 1 and mixing was performed with a V-type mixer (V-20, manufactured by Seishin Enterprise Co., Ltd.) to obtain a two-component developer CD1.

Production Examples of Cyan Two-Component Developers CD2 to CD31

Two-component developers CD2 to CD31 were obtained in the same manner as in the production example of two-component developer CD1, except that the toner was changed as shown in Table 11.

Production Example of Magenta Two-Component Developer MD1

A total of 8.0 parts of magenta toner MT1 was added to 92.0 parts of the magnetic carrier 1 and mixing was performed with a V-type mixer (V-20, manufactured by Seishin Enterprise Co., Ltd.) to obtain a two-component developer MD1.

Production Examples of Magenta Two-Component Developers MD2 to MD29

Two-component developers MD2 to MD29 were obtained in the same manner as in the production example of two-component developer MD1, except that the toner was changed as shown in Table 11.

Production Example of Yellow Two-Component Developer YD1

A total of 8.0 parts of yellow toner YT1 was added to 92.0 parts of the magnetic carrier 1 and mixing was performed with a V-type mixer (V-20, manufactured by Seishin Enterprise Co., Ltd.) to obtain a two-component developer YD1.

Production Examples of Yellow Two-Component Developers YD2 to YD29

Two-component developers YD2 to YD29 were obtained in the same manner as in the production example of two-component developer YD1, except that the toner was changed as shown in Table 11.

Production Examples of Yellow Two-Component Developers YD30 to YD58

Two-component developers YD30 to YD58 were obtained in the same manner as in the production example of two-component developer YD1, except that the toner was changed as shown in Tables 11-1, 11-2 and 11-3.

TABLE 11-1

| Cyan developer | | | Magenta developer | | |
|---|---|---|---|---|---|
| Two-component developer No. | Toner No. | Carrier No. | Two-component developer No. | Toner No. | Carrier No. |
| CD1 | CT1 | 1 | MD1 | MT1 | 1 |
| CD2 | CT2 | 1 | MD2 | MT2 | 1 |
| CD3 | CT3 | 1 | MD3 | MT3 | 1 |
| CD4 | CT4 | 1 | MD4 | MT4 | 1 |
| CD5 | CT5 | 1 | MD5 | MT5 | 1 |
| CD6 | CT6 | 1 | MD6 | MT6 | 1 |
| CD7 | CT7 | 1 | MD7 | MT7 | 1 |
| CD8 | CT8 | 1 | MD8 | MT8 | 1 |
| CD9 | CT9 | 1 | MD9 | MT9 | 1 |
| CD10 | CT10 | 1 | MD10 | MT10 | 1 |
| CD11 | CT11 | 1 | MD11 | MT11 | 1 |
| CD12 | CT12 | 1 | MD12 | MT12 | 1 |
| CD13 | CT13 | 1 | MD13 | MT13 | 1 |
| CD14 | CT14 | 1 | MD14 | MT14 | 1 |
| CD15 | CT15 | 1 | MD15 | MT15 | 1 |
| CD16 | CT16 | 1 | MD16 | MT16 | 1 |
| CD17 | CT17 | 1 | MD17 | MT17 | 1 |
| CD18 | CT18 | 1 | MD18 | MT18 | 1 |
| CD19 | CT19 | 1 | MD19 | MT19 | 1 |
| CD20 | CT20 | 1 | MD20 | MT20 | 1 |
| CD21 | CT21 | 1 | MD21 | MT21 | 1 |
| CD22 | CT22 | 1 | MD22 | MT22 | 1 |
| CD23 | CT23 | 1 | MD23 | MT23 | 1 |
| CD24 | CT24 | 1 | MD24 | MT24 | 1 |
| CD25 | CT25 | 1 | MD25 | MT25 | 1 |
| CD26 | CT26 | 1 | MD26 | MT26 | 1 |
| CD27 | CT27 | 1 | MD27 | MT27 | 1 |
| CD28 | CT28 | 1 | MD28 | MT28 | 1 |
| CD29 | CT29 | 1 | MD29 | MT29 | 1 |
| CD30 | CT30 | 2 | | | |
| CD31 | CT31 | 3 | | | |

TABLE 11-2

| Yellow developer | | |
|---|---|---|
| Two-component developer No. | Toner No. | Carrier No. |
| YD1 | YT1 | 1 |
| YD2 | YT2 | 1 |
| YD3 | YT3 | 1 |
| YD4 | YT4 | 1 |
| YD5 | YT5 | 1 |
| YD6 | YT6 | 1 |
| YD7 | YT7 | 1 |
| YD8 | YT8 | 1 |
| YD9 | YT9 | 1 |
| YD10 | YT10 | 1 |
| YD11 | YT11 | 1 |
| YD12 | YT12 | 1 |
| YD13 | YT13 | 1 |
| YD14 | YT14 | 1 |
| YD15 | YT15 | 1 |
| YD16 | YT16 | 1 |
| YD17 | YT17 | 1 |
| YD18 | YT18 | 1 |
| YD19 | YT19 | 1 |
| YD20 | YT20 | 1 |
| YD21 | YT21 | 1 |
| YD22 | YT22 | 1 |
| YD23 | YT23 | 1 |
| YD24 | YT24 | 1 |
| YD25 | YT25 | 1 |
| YD26 | YT26 | 1 |
| YD27 | YT27 | 1 |
| YD28 | YT28 | 1 |
| YD29 | YT29 | 1 |

TABLE 11-3

| Yellow developer | | |
|---|---|---|
| Two-component developer No. | Toner No. | Carrier No. |
| YD30 | YT30 | 1 |
| YD31 | YT31 | 1 |
| YD32 | YT32 | 1 |
| YD33 | YT33 | 1 |
| YD34 | YT34 | 1 |
| YD35 | YT35 | 1 |
| YD36 | YT36 | 1 |
| YD37 | YT37 | 1 |
| YD38 | YT38 | 1 |
| YD39 | YT39 | 1 |
| YD40 | YT40 | 1 |
| YD41 | YT41 | 1 |
| YD42 | YT42 | 1 |
| YD43 | YT43 | 1 |
| YD44 | YT44 | 1 |
| YD45 | YT45 | 1 |
| YD46 | YT46 | 1 |
| YD47 | YT47 | 1 |
| YD48 | YT48 | 1 |
| YD49 | YT49 | 1 |
| YD50 | YT50 | 1 |
| YD51 | YT51 | 1 |
| YD52 | YT52 | 1 |
| YD53 | YT53 | 1 |
| YD54 | YT54 | 1 |
| YD55 | YT55 | 1 |
| YD56 | YT56 | 1 |
| YD57 | YT57 | 1 |
| YD58 | YT58 | 1 |

A method for evaluating images obtained by using the abovementioned two-component developers is described below.

Evaluation of Color Gamut

A Canon full-color copying machine imageRUNNER ADVANCE C5255 was used as an image forming apparatus for evaluation. The evaluation environment was normal temperature and humidity environment (23° C., 50% RH), the evaluation paper was plain copier paper GFC-081 (A4, basis weight 81.4 g/m$^2$, sold by Canon Marketing Japan Co., Ltd.), 1 cm×1 cm patch images were output, the toner laid-on level was adjusted to 0.35 g/m$^2$ with a controller, and fixed patch images were output while adjusting the temperature of the fixing roller so that the gloss of the images was 20 to 25. The above range of gloss generally corresponds to high gloss. Here, the gloss was measured by using a handy gloss meter Gloss Meter PG-3D (manufactured by Nippon Denshoku Industries, Co., Ltd.) to measure the average value of three arbitrary points of each image under the condition of an incident angle of light of 75°. This average value was taken as the gloss value of the image.

For image evaluation, a spectrocolorimeter (CM-2600d, manufactured by Konica Minolta, Inc.) was used, a gamut volume was simulated using the results obtained by measuring the spectral reflectance of each patch obtained above of 380 nm to 780 nm, and the percentage change in the color gamut volume with respect to a reference was evaluated. Comparative Example 7 was used as the reference for Examples 1 to 20, 41, and 42, Comparative Examples 1 to 6, and Comparative Examples 8 and 9, and Comparative Example 16 was used as the reference for Examples 21 to 40, Comparative Examples 10 to 15, and Comparative Examples 17 and 18,. The evaluation results are shown in Tables 12-1 and 12-2.

TABLE 12-1

| | Two-component developer | | | Color gamut evaluation |
|---|---|---|---|---|
| | Cyan | Magenta | Yellow | |
| Example1 | CD1 | MD1 | YD1 | 103.0 |
| Example2 | CD2 | MD2 | YD2 | 101.3 |
| Example3 | CD3 | MD3 | YD3 | 100.6 |
| Example4 | CD4 | MD4 | YD4 | 102.4 |
| Example5 | CD5 | MD5 | YD5 | 100.3 |
| Example6 | CD6 | MD6 | YD6 | 102.1 |
| Example7 | CD7 | MD7 | YD7 | 100.9 |
| Example8 | CD8 | MD8 | YD8 | 102.7 |
| Example9 | CD9 | MD9 | YD9 | 100.6 |
| Example10 | CD10 | MD10 | YD10 | 102.1 |
| Example11 | CD11 | MD11 | YD11 | 102.4 |
| Example12 | CD12 | MD12 | YD12 | 101.8 |
| Example13 | CD13 | MD13 | YD13 | 102.1 |
| Example14 | CD14 | MD14 | YD14 | 101.8 |
| Example15 | CD15 | MD15 | YD15 | 101.8 |
| Example16 | CD16 | MD16 | YD16 | 101.5 |
| Example17 | CD17 | MD17 | YD17 | 100.7 |
| Example18 | CD18 | MD18 | YD18 | 101.5 |
| Example19 | CD19 | MD19 | YD19 | 101.3 |
| Example20 | CD20 | MD20 | YD20 | 101.1 |
| Comparative Example1 | CD21 | MD21 | YD21 | 99.4 |
| Comparative Example2 | CD22 | MD22 | YD22 | 99.4 |
| Comparative Example3 | CD23 | MD23 | YD23 | 99.2 |
| Comparative Example4 | CD24 | MD24 | YD24 | 99.1 |
| Comparative Example5 | CD25 | MD25 | YD25 | 99.1 |
| Comparative Example6 | CD26 | MD26 | YD26 | 99.2 |
| Comparative Example7 | CD27 | MD27 | YD27 | 100.0 |
| Comparative Example8 | CD28 | MD28 | YD28 | 99.4 |
| Comparative Example9 | CD29 | MD29 | YD29 | 99.2 |

TABLE 12-2

| | Two-component developer | | | Color gamut evaluation |
|---|---|---|---|---|
| | Cyan | Magenta | Yellow | |
| Example21 | CD1 | MD1 | YD30 | 102.9 |
| Example22 | CD2 | MD2 | YD31 | 101.5 |
| Example23 | CD3 | MD3 | YD32 | 100.8 |
| Example24 | CD4 | MD4 | YD33 | 102.5 |
| Example25 | CD5 | MD5 | YD34 | 100.4 |
| Example26 | CD6 | MD6 | YD35 | 101.9 |
| Example27 | CD7 | MD7 | YD36 | 100.7 |
| Example28 | CD8 | MD8 | YD37 | 102.5 |
| Example29 | CD9 | MD9 | YD38 | 100.4 |
| Example30 | CD10 | MD10 | YD39 | 101.8 |
| Example31 | CD11 | MD11 | YD40 | 102.1 |
| Example32 | CD12 | MD12 | YD41 | 101.5 |
| Example33 | CD13 | MD13 | YD42 | 101.8 |
| Example34 | CD14 | MD14 | YD43 | 102.2 |
| Example35 | CD15 | MD15 | YD44 | 101.7 |
| Example36 | CD16 | MD16 | YD45 | 101.6 |
| Example37 | CD17 | MD17 | YD46 | 100.8 |
| Example38 | CD18 | MD18 | YD47 | 101.4 |
| Example39 | CD19 | MD19 | YD48 | 101.2 |
| Example40 | CD20 | MD20 | YD49 | 101.1 |
| Comparative Example10 | CD21 | MD21 | YD50 | 99.2 |
| Comparative Example11 | CD22 | MD22 | YD51 | 99.3 |
| Comparative Example12 | CD23 | MD23 | YD52 | 99.2 |
| Comparative Example13 | CD24 | MD24 | YD53 | 99.1 |
| Comparative Example14 | CD25 | MD25 | YD54 | 99.2 |
| Comparative Example15 | CD26 | MD26 | YD55 | 99.3 |
| Comparative Example16 | CD27 | MD27 | YD56 | 100.0 |
| Comparative Example17 | CD28 | MD28 | YD57 | 99.5 |
| Comparative Example18 | CD29 | MD29 | YD58 | 99.3 |
| Example 41 | CD30 | MD1 | YD1 | 100.4 |
| Example 42 | CD31 | MD1 | YD1 | 101.2 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073404, filed Apr. 23, 2021, and Japanese Patent Application No. 2022-006121, filed Jan. 19, 2022, which are hereby incorporated by reference herein in their entirety.

What is claimed is:

1. A toner, comprising:
   a toner particle comprising a colorant, a binder resin and calcium carbonate particles;
   the binder resin comprising a polyester resin having an aromatic ring concentration of 55 to 70 mol % when aromatic ring concentration (mol %)=(number of moles of carbon constituting aromatic rings)/(total number of moles of carbon)×100;
   the polyester resin being a condensate of a polyhydric alcohol compound and a polyvalent carboxylic acid compound;
   the polyvalent carboxylic acid compound comprising a terephthalic acid; and
   a surface of the calcium carbonate particles being coated with a fatty acid, wherein
   a content ratio of the polyester resin in the toner particle is 45 to 80% by mass,
   the calcium carbonate particles have a number average particle diameter of 150 to 800 nm,
   an amount of colorant in the toner particle is 1.0 to 20.0% by mass,
   an amount of calcium carbonate particles in the toner particle is 2.5 to 10.0% by mass, and
   A/B is 0.8 to 2.5, where A (% by mass) is the amount of colorant in a toner particle and B (% by mass) is the amount of calcium carbonate particles in the toner particle.

2. The toner according to claim 1, wherein the amount of colorant in the toner particle is 1.0 to 10.0% by mass.

3. The toner according to claim 1, wherein the binder resin comprises a resin having a polystyrene skeleton.

4. The toner according to claim 3, wherein an amount of resin having the polystyrene skeleton in the toner particle is 0.3 to 25% by mass.

5. The toner according to claim 3, wherein the resin having the polystyrene skeleton is a styrene-acrylic acid ester copolymer.

6. The toner according to claim 1, wherein the aromatic ring concentration of the polyester resin is 55 to 60 mol %.

7. The toner according to claim 1, wherein an amount of the fatty acid coated on the calcium carbonate particles is 0.1 to 5.0% by mass.

8. The toner according to claim 1, wherein the fatty acid is a linear saturated fatty acid having 8 to 28 carbon atoms.

9. The toner according to claim 1, wherein the fatty acid is stearic acid.

10. The toner according to claim 1, wherein the colorant comprises a pigment having an SP value of 8.0 to 10.0 $(cal/cm^3)^{(1/2)}$.

11. The toner according to claim 1, wherein the colorant comprises at least one member selected from the group consisting of a magenta pigment, a cyan pigment and a yellow pigment.

12. The toner according to claim 1, wherein the polyhydric alcohol compound comprises an alkylene oxide adduct of bisphenol A.

* * * * *